United States Patent
Barak et al.

(10) Patent No.: US 10,657,147 B2
(45) Date of Patent: *May 19, 2020

(54) SYSTEM AND METHODS FOR SEARCHING AND COMMUNICATION

(71) Applicant: LivePerson, Inc., New York, NY (US)

(72) Inventors: Matan Barak, Ra'anana (IL); Julius Schorzman, San Francisco, CA (US); Nir Holtzman Ninio, Tel Aviv (IL); Uri Goldstein, Tel Aviv (IL)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,895

(22) Filed: Dec. 20, 2016

(65) Prior Publication Data
US 2017/0169081 A1 Jun. 15, 2017

Related U.S. Application Data

(63) Continuation of application No. 14/711,609, filed on May 13, 2015, now Pat. No. 9,563,707, which is a
(Continued)

(51) Int. Cl.
G06F 17/30 (2006.01)
G06F 16/248 (2019.01)
(Continued)

(52) U.S. Cl.
CPC ............ G06F 16/248 (2019.01); G06F 16/13 (2019.01); G06F 16/22 (2019.01);
(Continued)

(58) Field of Classification Search
CPC ........... G06F 17/3053; G06F 17/30545; G06F 17/30864
(Continued)

(56) References Cited

U.S. PATENT DOCUMENTS 5,450,537 A 9/1995 Hirai et al.
5,517,405 A 5/1996 McAndrew et al.
(Continued)

FOREIGN PATENT DOCUMENTS

EP 840244 A1 5/1998
EP 1233361 A1 8/2002
(Continued)

OTHER PUBLICATIONS

Chartrand Sabra, "A new system seeks to ease the bottleneck in the customer-service information highway," The New York Times (Apr. 30, 2001), 2 pages.
(Continued)

Primary Examiner — Alexandria Y Bromell
(74) Attorney, Agent, or Firm — Polsinelli LLP

(57) ABSTRACT

Described are computer-based methods and apparatuses, including computer program products, comprising the steps of, or structure for, storing a plurality of expert profiles in a database, each of the plurality of expert profiles comprising information associated with a person having knowledge in a particular category, subject or topic; receiving search criteria over a network from a query source; selecting at least one of the plurality of expert profiles comprising information that satisfy the search criteria; and transmitting expert profile data for each of the selected expert profiles to the remote search engine, the expert profile data comprising data that defines a displayable representation of a corresponding expert profile, the expert profile data further comprising data that facilitates a client-initiated, real-time communication session over the network with a person associated with the corresponding expert profile.

20 Claims, 10 Drawing Sheets

Related U.S. Application Data continuation of application No. 14/500,502, filed on Sep. 29, 2014, now Pat. No. 9,582,579, which is a continuation of application No. 14/317,346, filed on Jun. 27, 2014, now Pat. No. 9,569,537, which is a continuation of application No. 12/725,999, filed on Mar. 17, 2010, now Pat. No. 8,805,844, which is a continuation of application No. 12/535,539, filed on Aug. 4, 2009, now abandoned, and a continuation of application No. 14/500,537, filed on Sep. 29, 2014, now Pat. No. 9,558,276, which is a continuation of application No. 14/317,346, filed on Jun. 27, 2014, now Pat. No. 9,569,537, which is a continuation of application No. 12/725,999, filed on Mar. 17, 2010, now Pat. No. 8,805,844, which is a continuation of application No. 12/535,539, filed on Aug. 4, 2009, now abandoned.

(60) Provisional application No. 61/085,992, filed on Aug. 4, 2008.

(51) Int. Cl.

| | | |
|---|---|---|
| *G06F 16/13* | (2019.01) | |
| *G06F 16/22* | (2019.01) | |
| *G06F 16/28* | (2019.01) | |
| *G06F 16/335* | (2019.01) | |
| *G06F 16/951* | (2019.01) | |
| *G06F 16/9535* | (2019.01) | |
| *G06F 16/2457* | (2019.01) | |
| *G06F 17/22* | (2006.01) | |
| *H04L 12/58* | (2006.01) | |
| *H04L 29/06* | (2006.01) | |
| *H04L 12/911* | (2013.01) | |

(52) U.S. Cl.
CPC ...... *G06F 16/24578* (2019.01); *G06F 16/285* (2019.01); *G06F 16/335* (2019.01); *G06F 16/951* (2019.01); *G06F 16/9535* (2019.01); *G06F 17/2235* (2013.01); *H04L 47/783* (2013.01); *H04L 51/04* (2013.01); *H04L 67/42* (2013.01)

(58) Field of Classification Search
USPC .................................. 707/723, 738
See application file for complete search history.

(56) References Cited

U.S. PATENT DOCUMENTS

| | | |
|---|---|---|
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,183 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,554 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,797,133 A | 8/1998 | Jones et al. |
| 5,799,151 A | 8/1998 | Hoffer |
| 5,805,159 A | 9/1998 | Bertram et al. |
| 5,808,043 A | 9/1998 | Toader |
| 5,812,769 A | 9/1998 | Graber et al. |
| 5,815,883 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,940,811 A | 5/1999 | Norris |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |

(56) References Cited

U.S. PATENT DOCUMENTS

| | | |
|---|---|---|
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 * | 2/2003 | Slater .................. G06Q 10/10 707/728 |
| 6,535,492 B2 | 3/2003 | Shtivelman |
| 6,542,936 B1 | 4/2003 | Mayle et al. |
| 6,548,372 B1 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhail |
| 6,606,744 B1 | 8/2003 | Mikurak |
| 6,618,748 B1 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,778,982 B1 * | 8/2004 | Knight ................. G06Q 10/10 707/737 |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,888 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |

(56) References Cited

U.S. PATENT DOCUMENTS

| | | |
|---|---|---|
| 7,243,109 B2 | 7/2007 | Omega et al. |
| 7,251,848 B2 | 7/2007 | Chaudhuri et al. |
| 7,268,510 B2 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,538,320 B2 | 5/2009 | McQueen et al. |
| 7,552,080 B1 | 6/2009 | Willard et al. |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1* | 6/2010 | Kalogeraki ........... H04L 67/104 707/706 |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,895,193 B2* | 2/2011 | Cucerzan ............... G06F 16/951 707/721 |
| 7,958,066 B2 | 6/2011 | Pinokney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 | 3/2013 | Allen et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,888,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,256,761 B1 | 2/2016 | Sahu |
| 9,331,989 B2 | 5/2016 | Barak et al. |
| 9,336,487 B2 | 5/2016 | Lahav |
| 9,350,598 B2 | 5/2016 | Barak et al. |
| 9,396,436 B2 | 7/2016 | Lahav |
| 9,398,295 B2 | 7/2016 | Lahav et al. |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancescomet al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |

(56) References Cited

U.S. PATENT DOCUMENTS

| | | |
|---|---|---|
| 2004/0243539 A1 | 12/2004 | Skurtovich et al. |
| 2004/0249650 A1 | 12/2004 | Freedman et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bernasconi |
| 2005/0131944 A1 | 6/2005 | Edward |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijsinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Cheng |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0168874 A1 | 7/2007 | Kloeffer |
| 2007/0185751 A1 | 8/2007 | Dempers |
| 2007/0206086 A1* | 9/2007 | Baron ............ H04N 7/147 348/14.01 |
| 2007/0214048 A1* | 9/2007 | Chan ............ G06Q 30/02 705/14.69 |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0205024 A1 | 8/2010 | Shachar et al. |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0042389 A1 | 2/2012 | Bradley et al. |
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |

(56) References Cited

U.S. PATENT DOCUMENTS

| | | |
|---|---|---|
| 2012/0150973 A1 | 6/2012 | Barak |
| 2012/0173373 A1 | 7/2012 | Soroca |
| 2012/0195422 A1 | 8/2012 | Famous |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0117276 A1 | 5/2013 | Hedditch |
| 2013/0117804 A1 | 5/2013 | Chawla |
| 2013/0132194 A1 | 5/2013 | Rajaram |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0068011 A1 | 3/2014 | Zhang et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0310229 A1 | 10/2014 | Lahav et al. |
| 2014/0372240 A1 | 12/2014 | Freishtat et al. |
| 2015/0012602 A1 | 1/2015 | Schorzman et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Dasdan |
| 2016/0248706 A1 | 8/2016 | Karidi |
| 2016/0380932 A1 | 12/2016 | Matan et al. |
| 2017/0011146 A1 | 1/2017 | Lahav et al. |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A2 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
match.com "Match.com Launches Match.com Advisors," PR Newswire (Oct. 14, 2003), 2 pages.
Sitel, "Sitel to Provide Live Agent Support Online for Expertcity. com," PR Newswire (Feb. 28, 2000), 2 pages.
Webmaster World, "Link to my website is in a frame with banner ad at the top," www.webmasterworld.com (Nov. 11, 2003), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
Fairisaac, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony-It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.

(56) References Cited

OTHER PUBLICATIONS

"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_ File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
"What the Credit Bureau is Saying About You: If a Mistake Sneaks Into Your Record, You May Not Know About it Until You Get Turned Down for Credit", Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
"What Do FICO Scores Mean to Me?", http://www.sancap.com. (1999) 3 pages.
"What is a FICO Score?", http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet.com. (1999) 1 page.
"Phillips 86 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards-and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n. 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.

Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.
Plaintiffs Original Complaint, *Nextcard, LLC v. Liveperson, Inc.*; Civil Action No. 2:08-cv-00184-TJW, In the U.S. District Court for the Eastern District of Texas, Marshall Division, filed Apr. 30 2008 (7 pages).
Amended Complaint and Jury Demand; *Liveperson, Inc. v. Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC v. American Express Company, et al*; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC v. American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; *Nextcard, LLC v. American Express Company, et al*; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC v. American Express Company, et al*; Civil Action No. 2:07-cv-354 (TJW); In the U.S. District Court for the Eastern District of Texas, Marshall Division, filed Apr. 28 2008, 10 pages.

(56) References Cited

OTHER PUBLICATIONS

Plaintiffs Second Amended Reply to Counterclaims of Defendants HSBC North America Holdings Inc. and HSBC USA Inc.; *Nextcard, LLC v. American Express Company, et al*; Civil Action No. 2:07-cv-354 (TJW); In the U.S. District Court for the Eastern District of Texas, Marshall Division, filed May 14, 2008, 5 pages.

Plaintiffs Second Amended Reply to Counterclaims of Defendant DFS Services LLC; *Nextcard, LLC v. American Express Company, et al*; Civil Action No. 2:07-cv-354 (TJW); In the U.S. District Court for the Eastern District of Texas, Marshall Division, filed May 14, 2008 (71 pages).

Plaintiffs Second Amended Reply to Counterclaims of Defendant American Express Company; *Nextcard, LLC v. American Express Company, et al*; Civil Action No. 2:07-cv-354 (TJW); In the U.S. District Court for the Eastern District of Texas, Marshall Division, filed (May 8, 2008), 8 pages.

Justin Hibbard, Gregory Dalton, Mary E Thyfault. (Jun. 1998). "Web-based customer care." Information Week, (684) 18-20, 3 pages.

Kim S. Nash "Call all Customers." Computerworld, 32 (1), 25-28 (Dec. 1997), 2 pages.

PRN: "First American Financial Acquires Tele-Track Inc.," PR Newswire, (May 11, 1999), Proquest #41275773, 2 pages.

Young, Deborah, "The Information Store," (Sep. 15, 2000), Wireless Review, pp. 42, 44, 46, 48, 50.

Whiting et al., "Profitable Customers," (Mar. 29, 1999), Information Week, Issue 727, pp. 44, 45, 48, 52, 56.

Bayer, Judy, "A Framework for Developing and Using Retail Promotion Response Models," Cares Integrated Solutions, retrieved from www.ceresion.com (2007) 5 pages.

Bayer, Judy, "Automated Response Modeling System for Targeted Marketing," (Mar. 1998), Ceres Integrated Solutions, 5 pages.

Sweet et al., "Instant Marketing," (Aug. 12, 1999), Information Week, pp. 18-20.

SmartKids.com "Chooses Quadstone—The Smartest Customer Data Mining Solution," (Jul. 31, 2000), Business Wire, 2 pages.

"NCR's Next Generation Software Makes True Customer Relationship Management a Reality," (Jul. 26, 1999) PR Newswire, 3 pages.

"Quadstone System 3.0 Meets New Market Demand for Fast, Easy-to-Use Predictive Analysis for CRM," (May 22, 2000) Business Wire, 3 pages.

"Net Perceptions Alters Dynamics of Marketing Industry with Introduction of Net Perceptions for Call Centers," (Oct. 12, 1998) PR Newswire, 3 pages.

"Ceres Targeted Marketing Application," Ceres Integrated Solutions: retrieved from www.ceresios.com/Product/index.htm (2007) 3 pages.

Prince, C. J., E:business: A Look at the Future, Chief Executive, vol. 154, (Apr. 2000), pp. 10-11.

Oikarinen et al. "Internet Relay Chat Protocol" RFC-1459, pp. 1-65, (May 1993).

eDiet.com: Personalized Diets, Fitness, and Counseling, (May 3, 1998), pp. 1-15.

Fiszer, Max; "Customizing an inbound call-center with skills-based routing," Telemarketing & Call Center Solutions, (Jan. 1997), v15i7 p. 24; Proquest #11267840, 5 pages.

"ESL Federal Credit Union Inaugurates Internet Target Marketing." PR Newswire p. 4210 (Oct. 6, 1998), 3 pages.

"Welcome to eStara—The Industry Leader in Click to Call and Call Tracking Solutions," e-Stara, Inc., retrieved from www.estara.com on Mar. 21, 2013, 1 page.

"Push to Talk Live Now! From your website" iTalkSystem, Inc., retrieved from www.italksystems.com on Mar. 21, 2013, 1 page.

Richardson et al., "Predicting Clicks: Estimating the Click-Through Rate for New Ads," (May 2007) 9 pages.

"Welcome to Keen" retrieved from www.archive.org/web/20010302014355/http://www.keen.com/ on Jan. 25, 2013, 1 page.

Christophe Destruel, Herve Luga, Yves Duthen, Rene Caubet. "Classifiers based system for interface evolution." Expersys Conference, 265-270 (1997), 6 pages.

Ulla de Stricker, Annie Joan Olesen. "Is Management Consulting for You?" Searcher, 48-53 (Mar. 2005), 6 pages.

Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.

Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.

Elizabeth Sklar Rozier, Richard Alterman. "Participatory Adaptation." CHI, 97, 261-262 (Mar. 22-27,1997), 2 pages.

Frank White. "The User Interface of Expert Systems: What Recent Research Tells Us." Library Software Review, vol. 13, No. 2, p. 91-98 (Summer 1994) 8 pages.

Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.

Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.

International Search Report and Written Opinion for PCT Application No. PCT/US2013/041147, dated Jul. 30, 2013, 9 pages.

International Search Report and Written Opinion for PCT Application No. PCT/US2013/037086, dated Jul. 12, 2013, 9 pages.

International Search Report and Written Opinion for PCT Application No. PCT/US2013/29389, dated Jul. 24, 2013, 8 pages.

International Search Report and Written Opinion for PCT Application No. PCT/US2013/038212, dated Jul. 17, 2013, 11 pages.

International Search Report for PCT Application No. PCT/US03/41090, dated Sep. 1, 2004, 3 pages.

International Search Report for PCT Application No. PCT/US05/40012, dated Oct. 5, 2007, 2 pages.

International Preliminary Report on Patentability for PCT Application No. PCT/US2008/039630, dated Apr. 18, 2008, 4 pages.

International Search Report for PCT Application No. PCT/US2011/031239, dated Jul. 7, 2011, 3 pages.

International Search Report for PCT Application No. PCT/US2011/064948, dated Jun. 22, 2012, 3 pages.

International Preliminary Report on Patentability for PCT Application No. PCT/US2011/031239, dated Oct. 9, 2012, 8 pages.

International Search Report and Written Opinion for PCT Application No. PCT/US14/49822, dated Feb. 27, 2015, 11 pages.

Extended European Search Report dated Jul. 7, 2015 for European Patent Application No. 15161694.3; 8 pages.

International Preliminary Report on Patentability for PCT Application No. PCT/US2014/049822, dated Feb. 18, 2018, 7 pages.

Non-Final Office Action dated Dec. 11, 2008 for U.S. Appl No. 11/394,078, 15 pages.

Final Office Action dated Jul. 9, 2009 for U.S. Appl. No. 11/394,078, 15 pages.

Non-Final Office Action dated Jan. 28, 2010 for U.S. Appl. No. 11/394,078, 14 pages.

Final Office Action dated Jul. 9, 2010 for U.S. Appl. No. 11/394,078, 16 pages.

Non-Final Office Action dated Feb. 1, 2011 for U.S. Appl. No. 11/394,078, 20 pages.

Final Office Action dated Aug. 2, 2011 for U.S. Appl. No. 11/394,078, 23 pages.

Non-Final Office Action dated May 16, 2012 for U.S. Appl. No. 11/394,078, 23 pages.

Final Office Action dated Jan. 25, 2013 for U.S. Appl. No. 11/394,078, 22 pages.

Non-Final Office Action dated Jun. 22, 2012 for U.S. Appl. No. 13/080,324, 9 pages.

Non-Final Office Action dated Aug. 15, 2012 for U.S. Appl. No. 12/967,782, 31 pages.

Non-Final Office Action dated Jul. 29, 2011 for U.S. Appl. No. 12/608,117, 20 pages

(56) References Cited

OTHER PUBLICATIONS

Final Office Action dated Apr. 4, 2012 for U.S. Appl. No. 12/608,117, 25 pages.
Non-Final Office Action dated Apr. 24, 2004 for U.S. Appl. No. 09/922,753, 16 pages.
Final Office Action dated Oct. 14, 2004 for U.S. Appl. No. 09/922,753, 13 pages.
Non-Final Office Action dated May 17, 2005 for U.S. Appl. No. 09/922,753, 13 pages.
Non-Final Office Action dated Mar. 14, 2006 for U.S. Appl. No. 09/922,753, 13 pages.
Final Office Action dated Jul. 26, 2006 for U.S. Appl. No. 09/922,753, 13 pages.
Non-Final Office Action dated Aug. 13, 2008 for U.S. Appl. No. 09/922,753, 10 pages.
Final Office Action dated Apr. 23, 2009 for U.S. Appl. No. 09/922,753, 11 pages.
Non-Final Office Action dated Jul. 21, 2009 for U.S. Appl. No. 09/922,753, 10 pages.
Final Office Action dated Feb. 18, 2010 for U.S. Appl. No. 09/922,753, 9 pages.
Non-FInal Office Action dated Apr. 25, 2011 for U.S. Appl. No. 09/922,753, 9 pages.
Final Office Action dated Nov. 25, 2011 for U.S. Appl. No. 09/922,753, 10 pages.
Non-Final Office Action dated Aug. 7, 2007 for U.S. Appl. No. 10/980,613, 16 pages.
Non-Final Office Action dated May 15, 2008 for U.S. Appl. No. 10/980,613, 23 pages.
Non-Final Office Action dated Apr. 30, 2012 for U.S. Appl. No. 12/504,265, 16 pages.
Final Office Action dated Aug. 28, 2012 for U.S. Appl. No. 12/504,265, 28 pages.
800. Final Office Action dated Apr. 4, 2012 for U.S. Appl. No. 12/608,117, 25 pages.
Final Office Action dated Feb. 14, 2013 for U.S. Appl. No. 13/080,324, 11 pages.
Non-Final Office Action dated Mar. 30, 2013 for U.S. Appl. No. 11/360,530, 23 pages.
Final Office Action dated Apr. 11, 2013 for U.S. Appl. No. 12/967,782, 18 pages.
Non-Final Office Action dated May 10, 2013 for U.S. Appl. No. 13/563,708, 20 pages.
Non-Final Office Action dated Jun. 12, 2013 for U.S. Appl. No. 12/608,117, 56 pages.
Non-Final Office Action dated Jun. 20, 2013 for U.S. Appl. No. 13/157,936, 19 pages.
Non-Final Office Action dated Jun. 27, 2013 for U.S. Appl. No. 12/504,265, 11 pages.
Non-Final Office Action dated Jul. 8, 2013 for U.S. Appl. No. 13/413,197, 10 pages.
Final Office Action dated Oct. 21, 2013 for U.S. Appl. No. 12/504,265 14 pages.
Non-Final Office Action dated Oct. 30, 2013 for U.S. Appl. No. 13/961,072, 10 pages.
Non-Final Office Action dated Dec. 5, 2013 for U.S. Appl. No. 12/967,782, 14 pages.
Non-Final Office Action dated Dec. 4, 2014 for U.S. Appl. No. 14/275,698, 6 pages.
Notice of Allowance dated Jan. 3, 2014 for U.S. Appl. No. 11/360,530, 29 pages.
Final Office Action dated Jan. 22, 2014 for U.S. Appl. No. 12/608,117, 45 pages.
Final Office Action dated Jan. 27, 2014 for U.S. Appl. No. 13/563,708, 35 pages.
Non-Final Office Action dated Jan. 30, 2014 for U.S. Appl. No. 13/413,158, 19 pages.
Notice of Allowance dated Feb. 12, 2014 for U.S. Appl. No. 13/157,936, 33 pages.
Final Office Action dated Feb. 19, 2014 for U.S. Appl. No. 13/961,072, 35 pages.
Non-Final Office Action dated Feb. 20, 2014 for U.S. Appl. No. 10/980,613, 43 pages.
Notice of Allowance dated Feb. 28, 2014 for U.S. Appl. No. 09/922,753, 13 pages.
Notice of Allowance dated Mar. 25, 2014 for U.S. Appl. No. 12/504,265 31 pages.
Notice of Allowance dated Mar. 31, 2014 for U.S. Appl. No. 12/725,999, 41 pages.
Notice of Allowance dated Mar. 30, 2015 for U.S. Appl. No. 14/275,698, 11 pages.
Notice of Allowance dated Apr. 1, 2014 for U.S. Appl. No. 13/413,197, 32 pages.
Non-Final Office Action dated Jul. 17, 2014 for U.S. Appl. No. 11/394,078, 41 pages.
Non-Final Office Action dated Jul. 31, 2014 for U.S. Appl. No. 13/080,324, 38 pages.
Notice of Allowance dated Aug. 18, 2014 for U.S. Appl. No. 12/967,782, 43 pages.
Non-Final Office Action dated Aug. 21, 2014 for U.S. Appl. No. 10/980,613, 43 pages.
Final Office Action dated Mar. 12, 2015 for U.S. Appl. No. 13/080,324, 13 pages.
Non-Final Office Action dated Mar. 13, 2015 for U.S. Appl. No. 13/841,434, 26 pages.
Non-Final Office Action dated Apr. 9, 2015 for U.S. Appl. No. 13/830,719, 24 pages.
Final Office Action dated Apr. 7, 2015 for U.S. Appl. No. 11/394,078, 18 pages.
Non-Final Office Action dated Apr. 6, 2015 for U.S. Appl. No. 14/322,736, 13 pages.
Non-Final Office Action dated May 7, 2015 for U.S. Appl. No. 13/829,708, 16 pages.
Final Office Action dated May 8, 2015 for U.S. Appl. No. 10/980,613, 18 pages.
Non-Final Office Action dated May 13, 2015 for U.S. Appl. No. 14/317,346, 21 pages.
Non-Final Office Acton dated Jun. 2, 2015 for U.S. Appl. No. 12/608,117, 26 pages.
First Action Pre-Interview Communication dated Jun. 19, 2015 for U.S. Appl. No. 14/244,830, 7 pages.
Non-Final Office Action dated Jul. 20, 2015 for U.S. Appl. No. 14/711,609; 12 pages.
Non-Final Office Action dated Jul. 20, 2015 for U.S. Appl. No. 14/500,537; 12 pages.
Final Office Action dated Jul. 31, 2015 for U.S. Appl. No. 14/317,346, 13 pages.
Final Office Action dated Aug. 10, 2015 for U.S. Appl. No. 13/981,072, 12 pages.
Non-Final Office Action dated Aug. 14, 2015 for U.S. Appl. No. 14/543,397, 12 pages.
Non-Final Office Action dated Aug. 18, 2015 for U.S. Appl. No. 14/570,963, 23 pages.
Non-Final Office Action dated Aug. 27, 2015 for U.S. Appl. No. 11/394,078, 21 pages.
Non-Final Office Action dated Sep. 11, 2015 for U.S. Appl. No. 14/500,502; 12 pages.
Final Office Action dated Sep. 18, 2015 for U.S. Appl. No. 14/288,258, 17 pages.
Notice of Allowance dated Sep. 18, 2015 for U.S. Appl. No. 14/244,830, 11 pages.
First Action Interview Pilot Program Pre-Interview Communication dated Oct. 21, 2015 for U.S. Appl. No. 14/313,511, 3 pages.
Final Office Action dated Oct. 22, 2015 for U.S. Appl. No. 13/830, 719, 29 pages.
Final Office Action dated Nov. 10, 2015 for U.S. Appl. No. 13/841,434; 30 pages.
Final Office Acton dated Nov. 17, 2015 for U.S. Appl. No. 12/608,117, 32 pages.
Non-Final Office Action dated Dec. 4, 2015 for U.S. Appl. No. 10/980,613 21 pages.

(56) References Cited

OTHER PUBLICATIONS

Non-Final Office Action dated Dec. 24, 2015 for U.S. Appl. No. 14/317,346, 15 pages.
Notice of Allowance dated Dec. 30, 2015 for U.S. Appl. No. 14/322,736, 9 pages.
Non-Final Office Action dated Jan. 5, 2016 for U.S. Appl. No. 14/245400, 33 pages.
Notice of Allowance dated Jan. 7, 2016 for U.S. Appl. No. 14/313,511, 5 pages.
First Action Pre-Interview Communication dated Jan. 12, 2016 for U.S. Appl. No, 14/753,496, 3 pages.
Notice of Allowance dated Jan. 20, 2016 for U.S. Appl. No. 13/829,708, 11 pages.
Final Office Action dated Jan. 29, 2016 for U.S. Appl. No. 14/711,609; 15 pages.
Final Office Action dated Jan. 29, 2016 for U.S. Appl. No. 14/500,537; 15 pages.
Non-Final Office Action dated Feb. 12, 2016 for U.S. Appl. No. 13/080,324, 15 pages.
Notice of Allowance dated Mar. 16, 2016 for U.S. Appl. No. 14/582,550; 9 pages.
Notice of Allowance dated Mar. 21, 2016 for U.S. Appl. No. 14/753,496; 5 pages.
Final Office Action dated Apr. 14, 2016 for U.S. Appl. No. 10/980,613, 21 pages.
Final Office Action dated Apr. 21, 2016 for U.S. Appl. No. 14/317,346, 17 pages.
Non-Final Office Action dated Apr. 22, 2016 for U.S. Appl. No. 14/288,258 11 pages.
Notice of Allowance dated Apr. 22, 2016 for U.S. Appl. No. 11/394,078, 16 pages.
Non-Final Office Action dated May 12, 2016 for U.S. Appl. No. 13/961,072, 12 pages.
Non-Final Office Acton dated May 23, 2016 for U.S. Appl. No. 12/608,117, 35 pages.
Final Office Action dated Jun. 9, 2016 for U.S. Appl. No. 14/543,397, 18 pages.
Final Office Action dated Jun. 17, 2016 for U.S. Appl. No. 14/570,963, 18 pages.
Notice of Allowance dated Jun. 23, 2016 for U.S. Appl. No. 13/830,719; 26 pages.
Final Office Action dated Jun. 28, 2016 for U.S. Appl. No. 14/500,502, 10 pages.
Final Office Action dated Jul. 12, 2016 for U.S. Appl. No. 14/245,400, 36 pages.
First Action Pre-Interview Communication dated Jul. 14, 2016 for U.S. Appl. No. 14/970,225.
Final Office Action dated Sep. 8, 2016 for U.S. Appl. No. 13/080,324, 15 pages.
Notice of Allowance dated Sep. 21, 2016 for U.S. Appl. No. 14/711,609, 22 pages.
Notice of Allowance dated Sep. 22, 2016 for U.S. Appl. No. 14/500,537, 19 pages.
Notice of Allowance dated Sep. 23, 2016 for U.S. Appl. No. 13/841,434, 15 pages.
Notice of Allowance dated Sep. 30, 2016 for U.S. Appl. No. 14/317,346, 19 pages.
Notice of Allowance dated Oct. 7, 2016 for U.S. Appl. No. 14/288,258, 10 pages.
Non-Final Office Action dated Jan. 9, 2017 for U.S. Appl. No. 14/570,963, 16 pages.
Non-Final Office Action dated Jan. 13, 2017 for U.S. Appl. No. 14/543,397, 19 pages.
Notice of Allowance dated Jan. 13, 2017 for U.S. Appl. No. 15/294,441, 10 pages.

\* cited by examiner

ASK | tarot | Search
Advanced Search tarot cards by sharon

Expert in: Tarot Reading
Rating: ★★★★★
Languages: English

I am a fourth generation clairvoyant and I have studied the tarot years

Away

All sessions start FREE!

- Online: $0.59 per minute
- Email: 10.00 powered by LIVEPERSON

Narrow Your Search
Free Tarot Readings
Tarot Cards
Meaning of Each Tarot Card
Meanings for Tarot Cards
Free Love Tarot Reading
Tarot Spreads
Tarot Deck
How to Read Tarot Cards
Free Fortune And Tarot Readings
History of Tarot Cards More »

Expand Your Search
Astrology
Palm Reading
Wicca
Numerology
Free Spells
Runes
Fortune Telling
Witchcraft
Magic 8 Ball More »

Degrees
I have been a life long student of the metaphysics specializing in clairvoyance, and clairaudience, psychospiritual integration astrology numerology and the tarot

My Expert Service
I have over 20 years of experience in offering and guiding people to the right path I am a certified relationships specialist, and a fourth generation clairvoyant will you find your soulmate find out with a tarot card love reading depth detailed answers with love bussiness honest accurate in depth 1000
1002

SYSTEM AND METHODS FOR SEARCHING AND COMMUNICATION

CROSS REFERENCE TO RELATED APPLICATIONS

This application is a continuation of U.S. patent application Ser. No. 14/711,609 filed May 13, 2015, which is a continuation of U.S. patent application Ser. No. 14/500,502 filed Sep. 29, 2014, which is a continuation of U.S. patent application Ser. No. 14/317,346 filed Jun. 27, 2014, which is a continuation of U.S. patent application Ser. No. 12/725,999 filed Mar. 17, 2010, now issued as U.S. Pat. No. 8,805,844, which is a continuation of U.S. patent application Ser. No. 12/535,539 filed Aug. 4, 2009, which claims the benefit of and priority to U.S. Provisional Application 61/085,992 filed Aug. 4, 2008. This application is also a continuation of U.S. patent application Ser. No. 14/500,537 filed Sep. 29, 2014, which is a continuation of U.S. patent application Ser. No. 14/317,346 filed Jun. 27, 2014, which is a continuation of U.S. patent application Ser. No. 12/725,999 filed Mar. 17, 2010, now issued as U.S. Pat. No. 8,805,844, which is a continuation of U.S. patent application Ser. No. 12/535,539 filed Aug. 4, 2009, which claims the benefit of and priority to U.S. Provisional Application 61/085,992 filed Aug. 4, 2008. All of these applications are hereby incorporated by reference in their entireties for all purposes.

FIELD OF THE INVENTION

The present invention relates generally to computerized methods and apparatuses, including computer program products, which can interact with standard search engines or other query sources to enable searches for, and establish user communications with, an expert (e.g., a person having knowledge in a particular category, subject or topic) over a computerized network infrastructure.

BACKGROUND

There are various web search engines available for users to search for information on the World Wide Web (WWW). Some search engines operate by storing information about web pages retrieved by a web crawler. A web crawler is an automated web indexing program that accesses a web site, traverses through the site by following the links present on the pages, and compiles an index of those links and the information available via the links. The compiled index is stored in a database for use by a search engine.

When a user enters a keyword search query via a client terminal into a web-based search engine, the search engine examines the index and compiles a set of search results that match the keyword query. The search results are usually transmitted back to the client computer for presentation through a browser application to the user in the form of an ordered listing of web pages, images, information, and other types of files.

SUMMARY OF THE INVENTION

The techniques described herein provide computer-based methods and apparatuses, including computer program products, which can interact with standard search engines or other query sources to enable searches for, and establish user communications with, an expert (e.g., a person having knowledge in a particular category, subject or topic) over a computerized network infrastructure.

According to one aspect, such computerized methods and apparatuses include the steps of, or structure for, storing a plurality of expert profiles in a database, each of the plurality of expert profiles comprising information associated with a person having knowledge in a particular category; receiving search criteria over a network from a query source; selecting at least one of the plurality of expert profiles comprising information that satisfy the search criteria; and transmitting expert profile data for each of the selected expert profiles to the remote search engine, the expert profile data comprising data that defines a displayable representation of a corresponding expert profile, the expert profile data further comprising data that facilitates a client-initiated, real-time communication session over the network with a person associated with the corresponding expert profile. The expert profile data can further comprise data that facilitates a client-initiated, non-real-time communication session over the network with the person associated with the corresponding expert profile. The query source can be a remote search engine, for example. The search criteria can be based on a search query from the remote search engine.

According to another aspect, such computerized methods and apparatuses can include the steps of, or structure for, tracking information regarding each expert and determining a ranking of the experts and their corresponding profiles based on such information.

According to a first embodiment, such computerized methods and apparatuses can include the steps of, or structure for, tracking, for each of the plurality of expert profiles, revenue opportunities corresponding to displays of the expert profile within prior listings of search results and tracking revenues realized from client-initiated, real-time communication sessions associated with one or more of the revenue opportunities; determining, for each of the plurality of expert profiles, a ranking for the expert profile based on a ratio of the revenues realized relative to the revenue opportunities; and sorting the selected expert profiles for transmission within an ordered listing of search results to the query source according to the ranking determined for each of the selected expert profiles.

According to a second embodiment, such computerized methods and apparatuses can include the steps of, or structure for, such computerized methods and apparatuses can include the steps of, or structure for, tracking, for each of the plurality of expert profiles, revenue opportunities corresponding to displays of the expert profile within prior listings of search results, tracking online revenues realized from client-initiated, real-time communication sessions associated with one or more of the revenue opportunities, and tracking offline revenues realized from client-initiated, non-real-time communication sessions associated with one or more of the revenue opportunities; determining, for each of the plurality of expert profiles, an online ranking for the expert profile associated with an online status of the expert and an offline ranking for the expert profile associated with an offline status of the expert, wherein the online ranking is based on a ratio of the online revenues realized relative to the revenue opportunities and the offline ranking is based on a ratio of the offline revenues realized relative to the revenue opportunities; sorting the selected expert profiles for transmission within an ordered listing of search results according to one of the online ranking and offline ranking determined for each of the selected expert profiles; and transmitting the data associated with the selected expert profiles to the query source for display within the ordered listing of search results.

Any of the aforementioned embodiments can further include one or more of the following features. For example, such computerized methods and apparatuses can further include the steps of, or structure for, tracking positions of the expert profile within the prior listings of search results; applying weights to the revenue opportunities associated with the expert profile according to the tracked positions, resulting in weighted revenue opportunities that compensate for position bias; and determining the ranking, including online and offline rankings, for the expert profile based on a ratio of the revenue realized relative to weighted revenue opportunities. Such computerized methods and apparatuses can further include the steps of, or structure for, shuffling the ordered listing of search results prior to transmission of the expert profile data, such that at least one of the selected expert profiles is moved from a lower position within the ordered listing of search results to a higher position. Online, real-time communication sessions can comprise at least real-time chat sessions over a network, and offline, non-real-time communication sessions can comprise at least offline email sessions.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 7 is an exemplary screenshot showing an experts search results page on the expert search server through a browser according to one embodiment;

FIG. 8 is an exemplary screenshot showing an expert search server webpage for searching experts by category according to one embodiment;

FIG. 9 is an exemplary screenshot showing an expert profile page on an expert search server website according to one embodiment; and FIGS. 10A and 10B are exemplary screenshots showing expert profile pages presented by a generic search engine communicating using Application Programming Interface (API) calls with an expert search engine according to one embodiment.

DETAILED DESCRIPTION

Disclosed are embodiments of computerized methods and apparatuses, including computer program products, which can interact with standard search engines or other query sources to enable searches for, and establish user communications with, an expert (e.g., a person having knowledge in a particular category, subject or topic) over a computerized network infrastructure.

Such embodiments can include an expert search server system that stores expert profiles in a database that contain information associated with persons having registered themselves with the system as experts in a particular category, subject or topic for the purpose of providing their knowledge as an online and/or offline service available through the expert search server system. The expert search server system can receive search criteria transmitted over a computerized network infrastructure (hereinafter "network") from various query sources, such as search engines, operating remotely from the system. In response, the expert search system can analyze its database to select expert profiles satisfying the search criteria. Thereafter, the expert search system transmits data associated with the selected expert profiles to the respective query sources for use, including presentation of such profiles at the client computers.

For example, the expert profile data transmitted to the respective search engines can include data that defines a displayable representation (e.g., graphics and/or text) of the selected profiles for display as individual results within an ordered listing of search results. Further the expert profile data can further include data that facilitates client-initiated online, real-time communication sessions and/or offline, non-real-time communication sessions over the network with the corresponding experts through the system. Accordingly, the client computer receiving such expert profile data can attempt to establish communication on behalf of the end user with an expert identified in the search results. Online, real-time communication sessions can include real-time chat sessions over a network or internet telephony-based sessions, and offline, non-real-time communication sessions can include email or text messaging.

Figure 1:
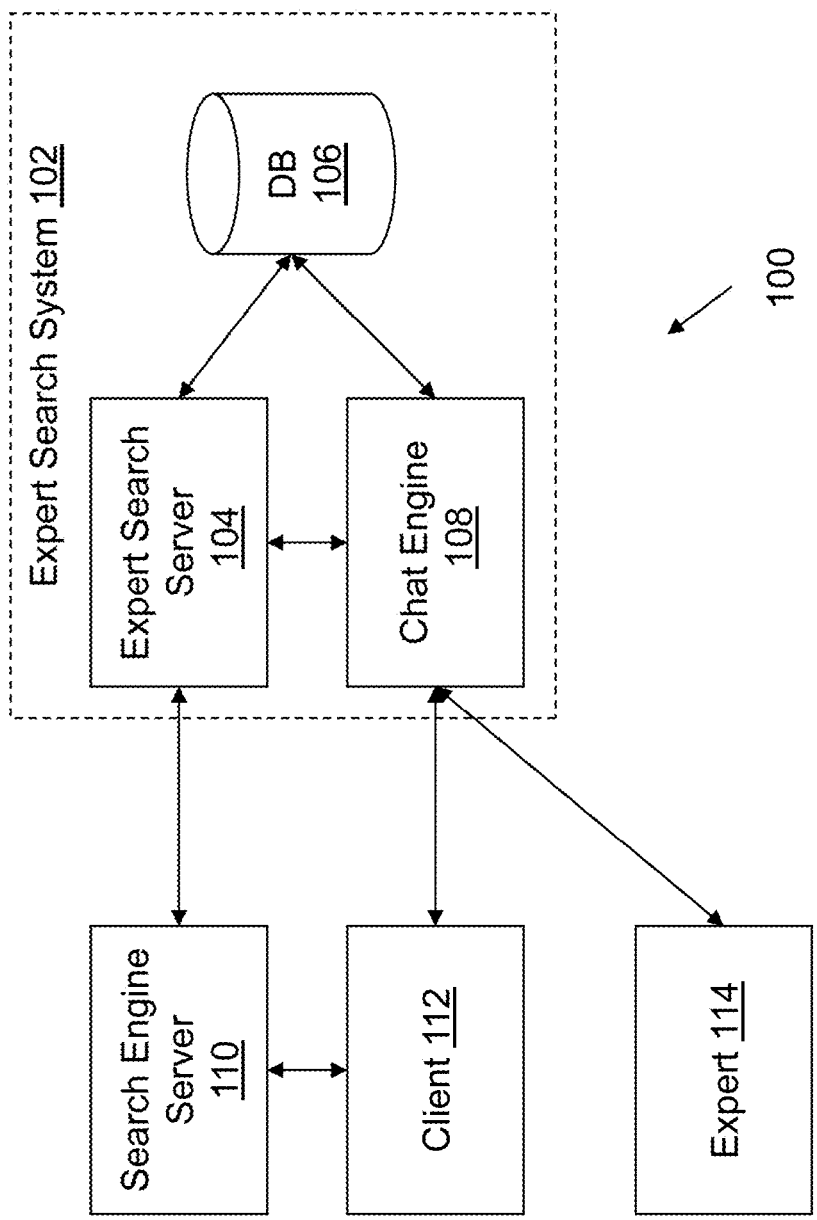
FIG. 1 is a diagram that illustrates a computerized system in which an expert search server system interacts with a remote search engine according to one embodiment.

FIG. 1 is a diagram that illustrates a computerized system in which an expert search server system interacts with a remote search engine according to one embodiment. As shown, the expert search server system 102 includes one or more expert search servers 104 in communication with a database 106 and a chat engine 108. Alternatively, the chat engine 108 can be replaced, or combined, with another communication server supporting email, internet telephony, or text messaging communication sessions, for example.

A search engine 110, operating remotely from the expert search system 102, communicates with the expert search server 104 over a network, such as the Internet. The search engine 110 can be implemented as a stand alone server or as an embedded service of a web page. In particular implementations, the search engine, in communication with the expert search server system 102, can provide listing of expert profiles as search results in response to user-input search queries (e.g., Ask.com)

A computer or other computerized terminal 112 associated with an end user (hereinafter "client computer 112") can interact with the search engine 110 or other query source over a network. A computer or other computerized terminal 114 associated with an end user that is registered with the expert search server 104 as an "expert" (hereinafter "expert computer 114") interacts with the expert search server 104 over a network. The client computer 112 and the expert computer 114 can be any general purpose computer, and preferably a computer that executes a web browsing software application. In certain embodiments, the client computer 112 and/or the expert computer 112 can be any computerized device, such as personal digital assistants (PDA) and mobile devices. The client computer 112 and the expert computer 114 can also communicate with each other through the chat engine 108 or other communication server of the expert search system 102 for email, text messaging, internet telephony.

The database 106 can act as a central source of data, including the expert profile information, for access by servers within the expert search system 102. In particular embodiments, the expert search server 104 and/or chat engine 108 can cache data obtained from the database 106 reducing the volume of database accesses. In such embodiments, whenever the expert profile information is updated on the database 106, the database can cause the other servers/services, through an associated trigger system, to update their locally cached data to reflect the changes made to the database 106. The triggering system (not shown) can be a computerized application service that interfaces with the database 106 and provides notifications of database changes to the servers within the expert search system 102. For example, the database 106 can maintain the status of each expert registered with the expert search system 102. Accordingly, the triggering system can be configured to send notifications whenever there is a change to an expert's status, e.g., online or offline and available or busy.

Other query sources, in addition to remote search engines, can be used as well. For example, a web banner can include code that, when executed or otherwise invoked by the client computer, automatically requests and displays listings of expert profiles by causing transmission of a hard-coded search query to the expert search server. For example, a web banner embedded within a web page dedicated to discussion threads and other information regarding Java programming can be used to present access to experts in Java programming available for contact.

Another query source can include so-called "category pages" that present listings of user-selectable categories (e.g., Style & Fashion, Psychics, Java Programming etc.). In response to user selection of a category link, code embedded in the category page can be invoked by the client computer to automatically request and display listings of expert profiles by causing transmission of a hard-coded search query to the expert search server.

Another query source can include various social networking sites (e.g., Facebook™ Twitter™) through which users can post queries to their "friends" and/or "friends of friends." For example, a social networking site can be configured with code, such that when a user posts a query to the social networking site for publishing to his or her friends, the code can be executed causing a server within the social networking site to transmit the posted query to the expert search server, thus automatically requesting a listing of expert profiles capable of handing such query for display.

Another query source can include so-called answer services, such as Aardvark™ Using the Aardvark™ answer service, a user can submit a question to the service via an instant message or e-mail. In turn, the Aardvark™ answer service identifies friends of the user, such as Facebook™ friends, that volunteer to answer the user's question. Thereafter, the answer service forwards the answer from the volunteer back to the requesting user that originally posted the question. Embodiments of the present invention can complement such answer services by also forwarding such queries to the expert search server, which in turn can provide the answer service with data associated with one or more expert profiles capable of handing such query and data to facilitate a client-initiated, communication session over the network with a person associated with the corresponding expert profile. Accordingly, with such information, either the answer service can transmit the question to the expert or forward the expert profile data to the requesting user so that he or she can facilitate a client-initiated, communication session, including email or instant messaging, over the network with the expert.

Figure 2:
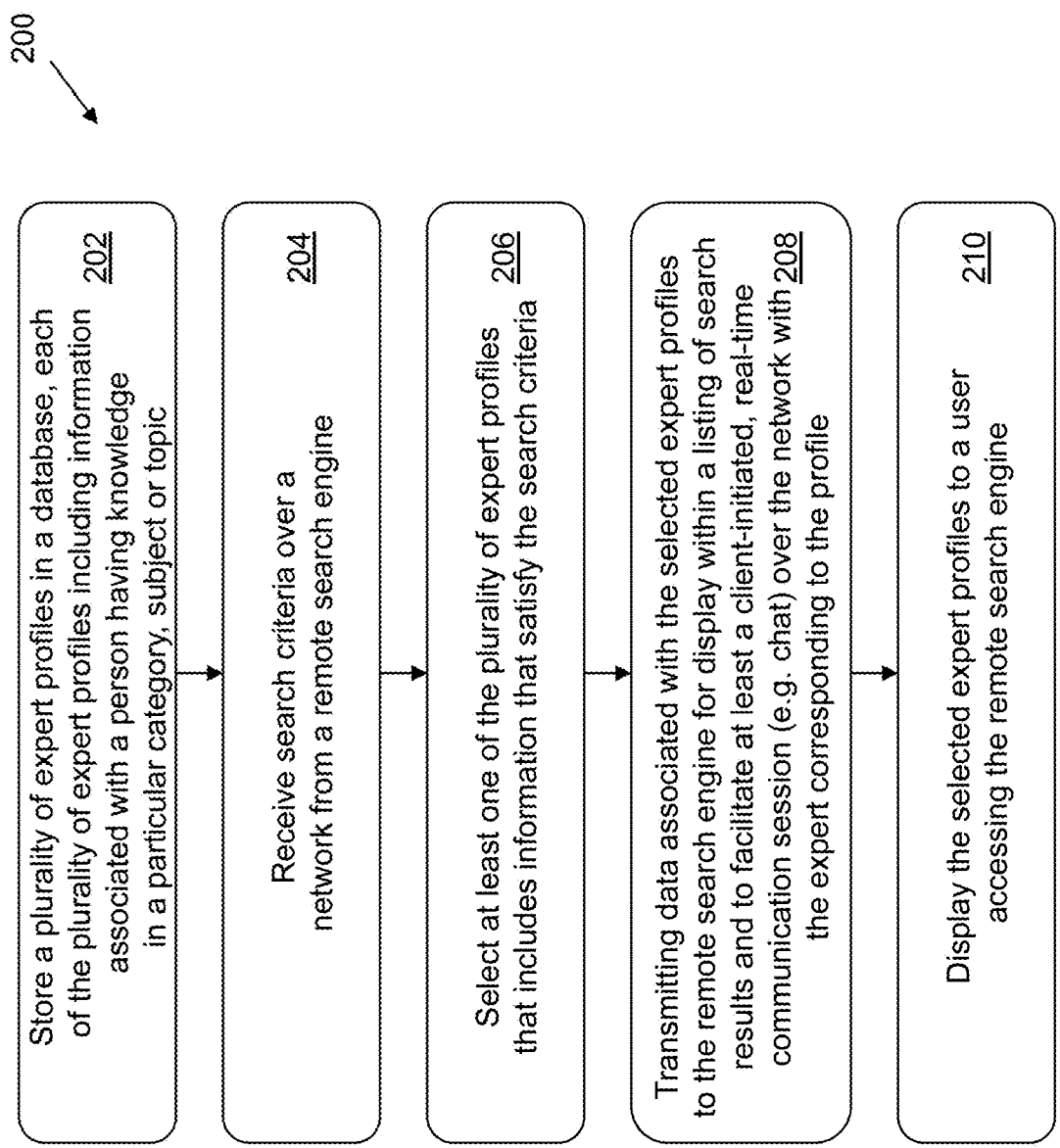
FIG. 2 is flow diagram that illustrates a method in which the expert search server system of FIG. 1 interacts with standard search engines enabling searches for, and establishing user communications with, an expert over a network according to one embodiment.

FIG. 2 is flow diagram that illustrates a method in which the expert search server system of FIG. 1 interacts with standard search engines enabling searches for, and establishing user communications with, an expert over a network according to one embodiment.

At step 202, the expert search server 104 stores a plurality of expert profiles in the database 106, such that each of the expert profiles includes information associated with a person having knowledge in a particular category, subject or topic. An end user can register as an expert with the expert search system 102 through a user interface (not shown) presented at the expert computer 114 by the expert search server 104. Upon completion of the registration process, an expert profile can be created and stored in the database 106. In some examples, newly created expert profiles can be approved manually by a support team having access to the expert search system 102, automatic rules in the expert search system 102 that validate portions of the newly created expert profile, or any combination thereof.

The expert profile can include a expert profile identifier; the name of the expert; online chat address, email address and/or other contact information; identification of one or more categories, subjects or topics in which the expert is knowledgeable; fee structure for services rendered by the expert through the system 102 (e.g., $0.50 per minute for online chat services), and other relevant information. The expert profile preferably includes data including executable instructions defining a displayable representation of the profile (e.g., graphics and/or text describing the expert), and preferably displayable through a web browser application executing on the client computer. The expert profiles can also be linked to a status table that indicates the current status of each expert as online or offline and available or busy, for example.

At step 204, the expert search server 104 receives search criteria over a network from the remote search engine 110 or other query source. In this example, the search engine 110 generates and transmits a request to the expert search server 104 for a list of expert profiles that satisfy a search query. The expert search request can be triggered in response to automated or manual entry of search queries into the search engine. For example, manual entry can involve the search engine receiving a keyword search query input from user via a client computer 112. Automated entry can involve the search engine being hardcoded with the desired search query. The request for experts can include, for example, the content of the search query, requested format of expert profiles for display (e.g., XML), maximum number of expert profiles, and a relevancy threshold that represents a minimum correlation between the search query and the expert profile information.

At step 206, the expert search server selects one or more expert profiles containing information that satisfy the search criteria. For example, the server can select matching profiles by referencing an index generated from the expert profile information.

At step 208, the expert search server 104 transmits data associated with the selected expert profiles to the search engine 110 for display within a listing of search results. Preferably, the expert profile data transmitted to the search engine includes data that facilitates client-initiated online and/or offline sessions over the network with the corresponding expert. Accordingly, the client computer 112 receiving such expert profile data through the search engine can attempt to establish communication over the network with an expert identified in the search results (e.g., online via chat or offline via email).

Figure 6:
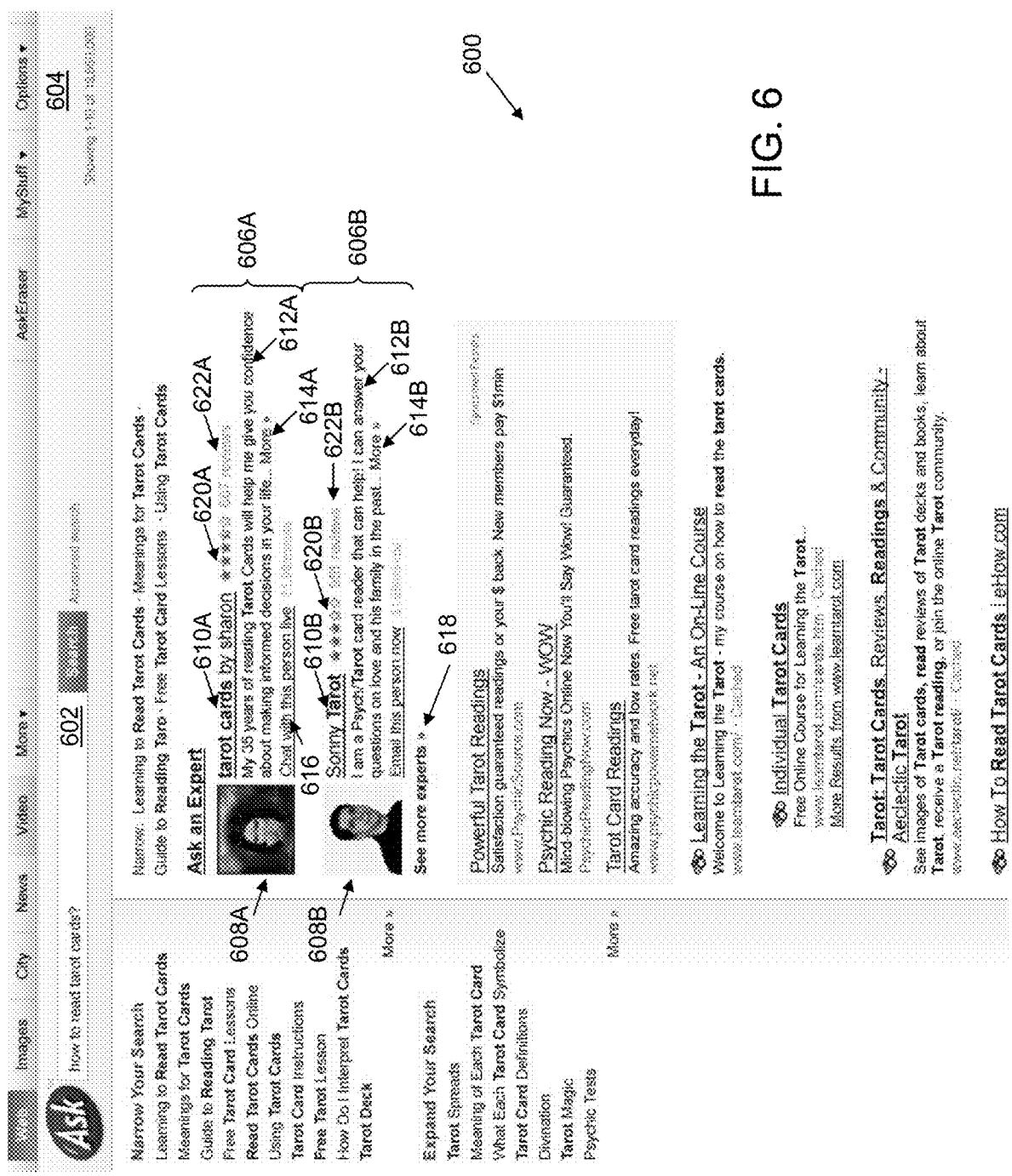
FIG. 6 is an exemplary screenshot showing an experts search results page provided through a search engine according to one embodiment.

At step 210, the search engine 110 causes the display of the selected expert profiles at the client computer 112. In particular implementation, the listing of expert profiles can optionally be displayed in combination with other search results obtained by the search engine 110 from other sources in response to a user search query. For example, FIG. 6 is an exemplary screenshot of search results from a search engine, including displays of expert profiles obtained by request from the expert search system, according to one embodiment. Specifically, the graphical and textual displays of expert profiles 606A, 606B are presented by a third party search engine (Ask.com™) in the search results page 600 in response to the search query 602 regarding tarot cards.

As shown, each display of the expert profiles 606A, 606B includes a respective picture 608A, 608B, name of the expert 610A, 610B, and brief description 612A, 612B. The user selectable "More" links 614A, 614B can cause the client computer 112 to present more detailed information from the expert profile, such as the profiles shown in FIGS. 9 and 10A. The user selectable "See More Experts" link 618 can cause the search engine to issue another request to the expert search server 104 for another set of expert profiles that satisfy the search query 602, as shown in FIG. 10B. The stars 620A, 620B and numerical values 622A, 622B provide an overall rating for the expert and the number of reviews received for this expert, respectively.

Furthermore, the display of the expert profiles can also indicate the current status of the selected experts, such as online or offline and available or busy. For example, such status information can be presented to the user in the form of a callback button or other selectable link within the display of the expert profile. The callback button or link is user-selectable causing the client computer 112 to establish communication with the corresponding expert on behalf of the end user.

For example, as shown in FIG. 6, the expert profile data transmitted from the expert search server 104 can cause the search engine to display a "Chat With This Person Live" link 616 when the expert is online and available. By selecting the "Chat With This Person Live" link 616, the user of the search engine website 604 can establish an online chat session over the network with the expert associated with the expert profile 606A in real-time between their respective computers 112, 114 through the chat engine 108 of the expert search system 102. Alternatively, where an expert's status is offline and thus the expert is not available for communication at that time, the expert profile data transmitted from the expert search server 104 can cause the search engine to display an "Email This Person Now" link 618. Accordingly, the client can engage in an offline, non-real-time email session with the expert.

In order for an expert to engage in online, real-time chat communication sessions, an expert can download and install on its expert computer 114 software referred to herein as an expert messenger application. An expert can obtain the software from the expert search server 104 at the time the expert registers with the system 102. Alternatively the expert messenger application is implemented with code supported by standard web browsers, such as a flash application code, avoiding the need to separately download and install such additional software.

An expert can be considered online if they are logged into the chat engine 108. For example, upon execution at the expert computer 114, the expert messenger application establishes a communication link over the network to the chat engine 108 and then transmits a message notifying the chat engine 108 that the expert is online and available to accept chat requests through the system 102. Conversely, when the expert chat messenger application is closed, the expert is logged off the chat engine 108 and the database 106 is updated to indicate the status of the expert as offline and thus not available to chat with end users. Particular implementations of the expert messenger application can also enable an expert to initiate transmission of messages to the chat engine 108 indicating his or her status. In turn, the chat engine 108, either directly or indirectly through the expert search server 104, can update the current status associated with the corresponding expert profile in the database 106 to indicate the expert's current status.

Once the user selects the callback button associated with an expert profile to initiate the chat, the client computer 112 executes a client chat application that presents a chat window through which to communicate with the expert. The chat window can be displayed integral to, or a separate from, the page from which the expert search query originated. Preferably, users are not required to separately download or install any communication software on their client computers 112. Rather the client chat application preferably includes code supported by standard web browsers, such as a flash application code.

The client chat application then directs the client computer 112 to send a request to the chat engine 108 in order to open a unique TCP socket connection over which to communicate with the desired expert. The chat engine 108 includes communication logic necessary to facilitate communication between client and expert computers. In response, the chat engine 108 sends a message over the network to the expert computer 114 notifying the expert messenger application of the user's chat request. Once accepted, preferably all communications between the client computer 112 and the expert computer 114 occur through the chat engine 108 via TCP socket connections. In other words, the client chat application and the expert messenger application communicate over separate TCP sockets connections to the chat engine 108, and the chat engine 108, in turn, delivers such communications over the appropriate destination TCP socket connections to the respective client and expert computers 112, 114. Such communications between the client and the expert can be encrypted to preserve the confidentiality of the conversation.

In particular embodiments, the expert search system 102 can optionally require user registration and/or payment authorization in advance of establishing the chat session with the expert through the chat engine 108. For example, first-time users can be required to create a user account prior to gaining access to experts over the expert search system 102. Users requesting services from particular experts can also be required to remit or configure payment in advance prior to communicating with the expert.

According to another aspect, such computerized methods and apparatuses can include the steps of, or structure for, tracking information regarding each expert, determining a ranking of the experts and their corresponding profiles based on such information, and sorting the expert profiles according to their determined prior to transmission to a remote search engine or other query source.

Figure 3:
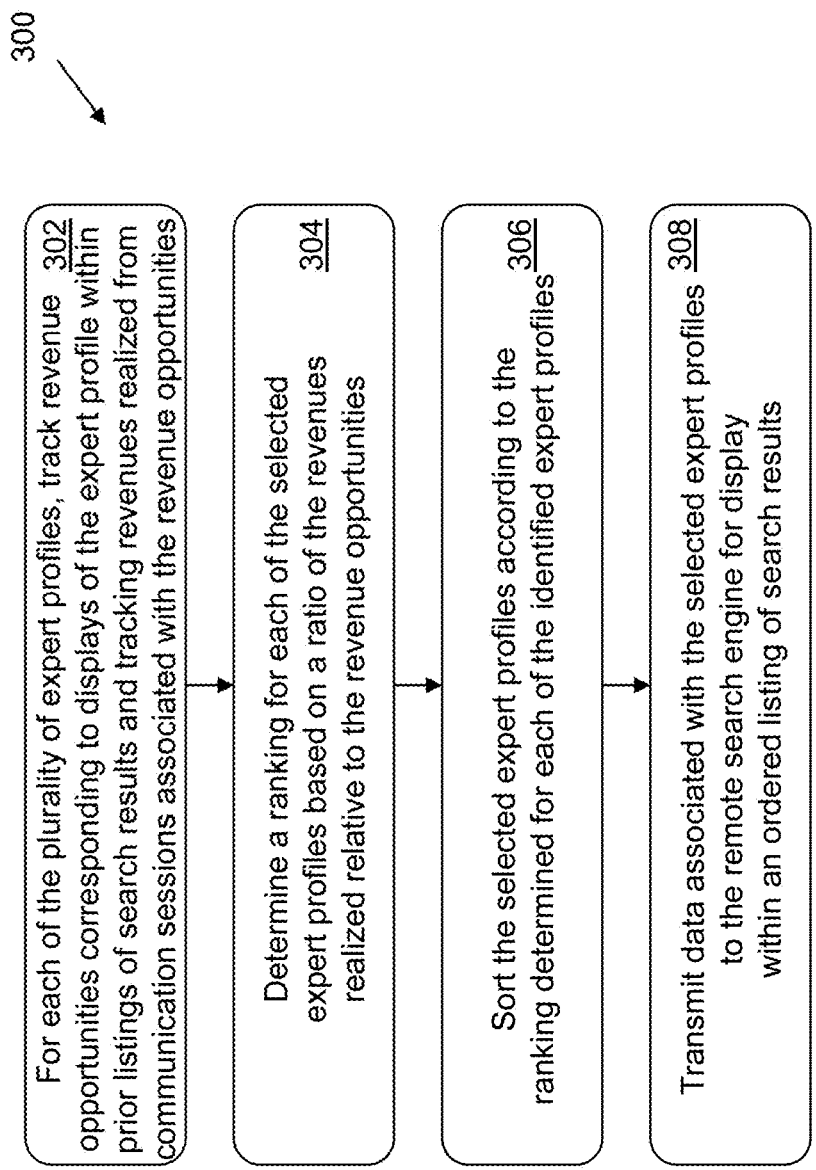
FIG. 3 is a flow diagram that illustrates a method for tracking information regarding each expert and determining a ranking of the experts and their corresponding profiles based on such information according to one embodiment.

FIG. 3 is a flow diagram that illustrates a method for tracking information regarding each expert and determining a ranking of the experts and their corresponding profiles based on such information according to one embodiment. At step 302, the expert search server 104 tracks revenue opportunities for each of the plurality of expert profiles and revenues realized from such revenue opportunities. At step 304, the expert search server 104 determines a ranking for each of the selected expert profiles based on a ratio of the revenues realized relative to the revenue opportunities. At step 306, the expert search server 104 sorts the selected expert profiles according to the ranking determined for each profile. In step 308, the expert search server 104 can transmit the selected expert profiles to the remote search engine server 110 or other query source for display within an ordered listing of search results.

Tracking of Revenue Opportunities and Realized Revenues

A revenue opportunity is preferably associated with a user view of an expert profile. An expert profile can be deemed viewed by a user in the event that data associated with the expert profile is transmitted to the search engine or other query source for display. For example, particular query sources can enable a user to conduct a search for experts through in a particular category (e.g., "Style & Fashion"). Each time a user selects the category for Style & Fashion, data associated with a list of expert profiles matching that category is transmitted from the expert search server 104 to the query source for presentation to the end user for display. As a result, each expert having profile data transmitted for display within a corresponding listing of search results is deemed to have experienced a revenue opportunity. Accordingly, for each revenue opportunity, the expert search server 104 updates the information associated with the respective expert profiles in the database 106 by incrementing a count representing the number of revenue opportunities (hereinafter "a revenue opportunity count").

The expert search server 104 can also preclude certain user views of an expert profile in certain contexts from the revenue opportunity count. For example, in some implementations of the expert search system 102, a registered user can be given access to a personal page (e.g., "My Experts" page) in which to maintain displays of desired expert profiles. Accordingly, user views of profiles in this context are preferably not included in the revenue opportunity count. Likewise, the revenue opportunity count is preferably not incremented multiple times to correspond to multiple views of an expert profile resulting from, for example, a user navigating from a search results page to a page providing more detailed information regarding the expert (e.g., by selecting the "More" link 614A, 614B as shown in FIG. 6). Rather, such the revenue opportunity count is incremented once to represent this scenario as a single revenue opportunity.

Additional information associated with a revenue opportunity can also be tracked. For example, the tracked information can further include, the profile identifier of the expert profile, the current status of the expert (e.g., online or offline), a timestamp corresponding to the display of the expert profile within a listing of search results (and thus viewing of the expert profile), position of the expert profile in the listing, context in which the expert profile is displayed (e.g., category pages, banners, query-based search results pages), a category identifier (if the context is a category page), a banner identifier (if the context is a banner), and/or a search query (if the context is a search results page based on user query).

The position in the list refers to the actual position of the expert profile as displayed within a listing of search results. For example, if the expert profile is displayed on the second category results page in the fourth position, and ten results are displayed per page, the position in the list for the expert profile is fourteen. Pagination refers to the number of results per page in the context that the expert profile was displayed. For example, a category page can be configured to display ten profiles per page, so the pagination is recorded as ten. However, for a banner embedded within a web page, the number of experts to return in a page may be variable and will need to be recorded individually for each banner.

Revenues can be realized from real-time and/or non-real-time communication sessions with a client in response to such revenue opportunities. Online, real-time communication sessions can include real-time chat sessions over a network or internet telephony-based sessions; and offline, non-real-time communication sessions can include email or text messaging.

With respect to online, real-time chat communication sessions, for example, between a user of the client computer 112 and an expert of the expert computer 114, the chat engine 102 can map an identifier associated with the particular chat session to a corresponding expert profile, such that revenues generated from session and other tracking data can be stored in the database 106 for the expert profile.

With respect to non-real-time email communication sessions, the expert search server 104 providing a mail service or a separate mail server (not shown) within the system 102 can manage local email accounts on the database 106 for the respective experts. For example, when a user selects link 618 to email a corresponding expert, the client computer 112 is redirected to the mail service of the expert search server 104 or a separate mail server (not shown). A user interface can be displayed at the client computer 112 through which the user can write and submit a message directly to the expert's email account in the system 102. Preferably, the user interface comprises one or more forms through which the user can negotiate and/or accept a fee for the expert's services. When the user accepts the expert fee by clicking on an "Accept" button in a form, for example, the expert search server 102 is notified and thereafter updates the database 106, such that the fee along with other information tracked for the particular email session is added to the corresponding expert profile. Once submitted, the mail service/server stores the email message in the expert's email account that is maintained at the database 106. In turn, the expert search server 102 notifies the expert of the incoming email by sending notification through the expert messenger application or a third party email account (e.g., Yahoo™). To obtain the email, the expert can log into the mail service/server and retrieve the message from his or her email account. A user interface can be displayed at the expert computer 112 through which the expert can write and submit an email message to the end user customer. Preferably, the user interface for the expert can also provide one or more forms through which the expert can negotiate a fee for his or her expert services with the end user.

The following example is a typically use case.
(1) A user views page one of a category of experts containing ten experts.
(2) The user continues to page two of the category which contains another ten experts.
(3) The user clicks on a selectable link to initiate a real-time or non-real-time communication session with the expert in position fifteen.
(4) The user establishes a communication session with the expert, hires the expert according to a particular fee or rate, and subsequently purchases $30 worth of assistance.

In this example, the tracking data, including the revenue generated from the session (i.e., $30 worth of revenue), is stored in the database 106 and associated with information regarding the corresponding revenue opportunity (e.g., view of the expert profile on the category page). The expert search server 104, by tracking revenue opportunities and any revenue realized from the revenue opportunities, facilitates attribution of the $30 revenue yield to the user view of the expert profile and also tracks the lack of realized revenue to the other nineteen expert profiles considered to have received a revenue opportunity.

Determining a Ranking for Each of the Selected Expert Profiles

With respect to step 304, the expert search server 104 determines a ranking for each of the selected expert profiles based on a ratio of the revenues realized relative to the tracked revenue opportunities as show in Equation 1:

ranking metric=revenue/revenue opportunities (1)

Such ranking can be implemented according to a number of embodiments.

According to a first embodiment, the expert search server 104 determines a ranking for each expert profile based on total revenues realized by the expert from all communication sessions relative to the total number of revenue opportunities. Certain revenue and revenue opportunities can be excluded from the ranking calculation. For example, chat or email sessions that are initiated with an expert from pages that are either bookmarked or otherwise stored by a user for direct access to the expert are preferably not considered revenue opportunities and thus not included in the calculation of the ranking metric.

According to a second embodiment, the expert search server 104 can determine an online ranking and an offline ranking for each expert profile based on respective revenues realized by the expert from online, real-time communication sessions and offline, non-real-time communication sessions relative to the total number of revenue opportunities (or relative to the respective numbers of revenue opportunities corresponding to the expert having an online and offline status).

Accordingly, by determining separate online and offline rankings for an expert, a ranking algorithm that is designed to rank experts having an online status higher than experts having an offline status can be compensated. For example, in a system that ranks online experts higher than offline experts, an expert may log into the expert search system 102 to obtain an online status for the sole purpose of gaining a higher ranking, even though they do not accept live chats other than to push users into offline sessions. Accordingly, this second embodiment can avoid such situations by having the expert search server 104 determine an online ranking and an offline ranking for all experts. As a result, the experts are ranked according to the actual methods of communication despite their current status as either online or offline. For example, if Expert A, who is currently offline, has a higher offline ranking than Expert B's online ranking, Expert A Offline is preferably ranked higher than Expert B, who is currently online.

In particular implementations, the second embodiment can be modified to handle the special case in which an expert's offline ranking is greater than his or her online ranking. In this special case, the expert search server 102 can be configured to rank the expert according to his or her greater offline ranking even if the expert's current status is online (e.g., if (offline rank>online rank) then online rank=offline rank).

According to a third embodiment, the expert search server 104 can determine a ranking that accounts for position bias associated with the display of expert profiles in prior listings of search results. Specifically, for each of the selected expert profiles, the expert search server 104 can determine a ranking based on a ratio of the revenues realized relative to the tracked revenue opportunities, such that each of revenue opportunities is weighted to account for position bias associated with the display of the expert profile within prior listings of search results.

Position bias refers to the tendency of users to commonly select the top search result provided in a listing of search results despite the quality of the underlying content. Furthermore, once a user identifies a satisfactory result, they typically do not continue down the list of search results. As a result, the display of an expert profile is inherently biased according to its position within a listing of search results, thus limiting the effectiveness of the revenue opportunity for that expert. Accordingly, it is preferably to compensate or otherwise adjust the ranking of expert profiles that are repeatedly placed lower on a search results page by applying a weight to each revenue opportunity according to the display position of the expert profile within prior search result listings. As a result, a revenue opportunity in which the expert profile is displayed towards the top of a listing of search results can be weighted less than revenue opportunities in which the expert profile is displayed towards the bottom of a listing of search results. Alternatively, a revenue opportunity in which the expert profile is displayed towards the bottom of a listing can be weighted more than revenue opportunities in which the expert profile is displayed towards the top of the listing.

Figure 4:
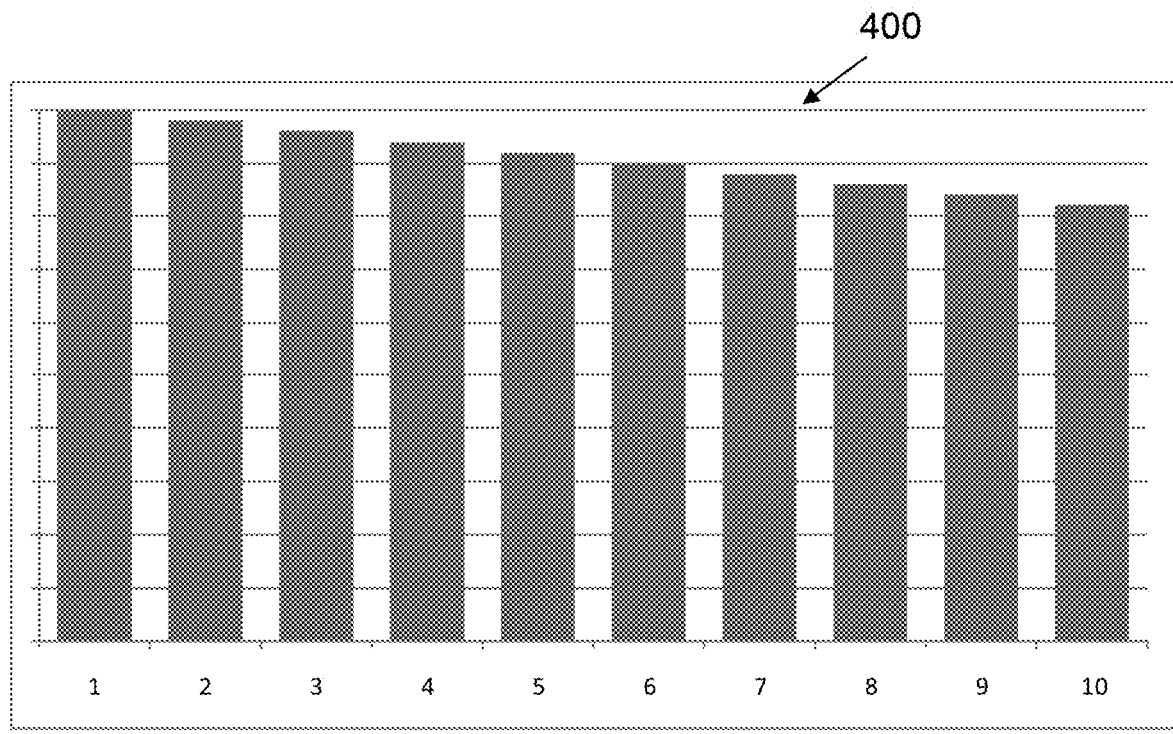
FIGS. 4 and 5 are exemplary diagrams of charts displaying information relevant to expert profile selection.
Figure 5:
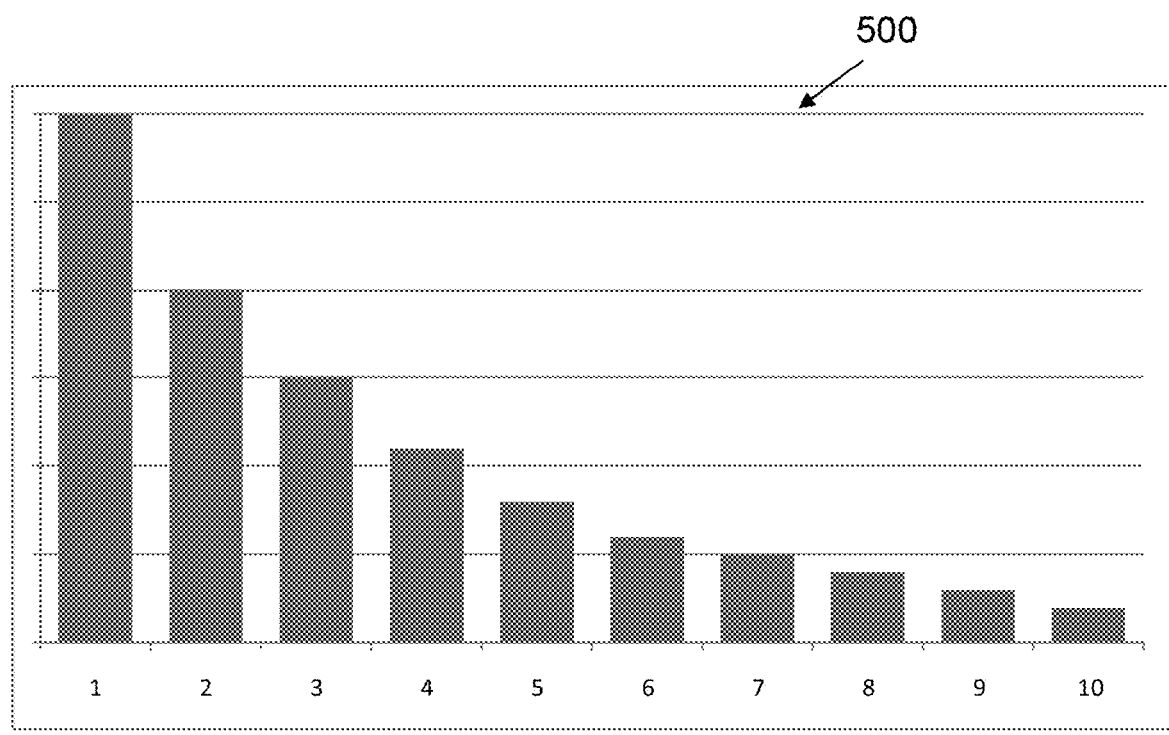

For example, as shown in chart 400 of FIG. 4, the top 10 experts presented on a first search page will usually all have similarly high values (e.g., quality values, click-through values, etc.). However, because the experts are presented in descending order from number 1 through number 10, a user may tend to pick from the experts in the topmost positions. This is because the user generally considers the experts in the top few positions to be the best results for their particular query. In another example, users may not consider experts beyond the first expert to be of sufficiently high enough quality. As a result, experts at the top of the list experience disproportionately higher click-through rates as shown in chart 500 of FIG. 5. Accordingly, as part of the ranking determination step, the expert search server 104 can use click through rates recorded as additional tracking data to adjust the revenue opportunity count of each expert page view to follow the curve of FIG. 5. As a result, the value of the revenue opportunity recorded for the experts in the topmost positions can be higher than the value for those further down the page, compensating for the expert's placement.

Sorting the Identified Expert Profiles According to the Determined Ranking

With respect to step 306, sorting can be accomplished in a number of embodiments.

According to a first embodiment, experts can be sorted from highest to lowest based on their ranking metric obtained from Equation 1.

According to a second embodiment, experts can be sorted to avoid over-ranking so-called "outliers." For example, if an Expert A makes $300 from one chat session resulting from one revenue opportunity (e.g., one profile view), then Expert A's revenue per opportunity is $300. Likewise, if Expert B makes $30,000 from 200 chat sessions resulting from 10,000 revenue opportunities (e.g., profile views), Expert B's revenue per opportunity is $3. Based on this calculation alone, Expert A is a higher ranking expert than Expert B. However, whereas Expert B has realized significantly more revenue relative to a significantly greater number of revenue opportunities, Expert B is more likely a more experienced, if not better, expert than Expert A. In order to accommodate for such disparity, the range of ranking metrics determined in step 304 can be weighted to incorporate statistical significance. Specifically, when calculating a range of ranking metrics at a confidence interval of, for example, 95%, the weighting can be adjusted to err on the lower bound of the range, which can advantageously prevent users with lower volumes of revenue opportunities from being ranked too high.

For example, the actual earning potential for an expert can be determined with a certain confidence level as follows. The inputs to this calculation preferably include a confidence level that represents a degree of certainty to which a statistical prediction (e.g., mean value) can be trusted, a sample size that represents the current number of profile views (earning opportunities), a mean value that represents the average value earned per profile view and a standard deviation value that represents the dispersion of the overall data set (e.g. individual fees collected by the expert from the paid sessions). Thus, for a confidence level of 95%, a sample size of 10, a mean value of $50 and a standard deviation of $20, a standard score can be calculated using any standard statistical techniques known to one skilled in the art. Thereafter, the actual earning potential for the expert can be determined using the formula:

$$\text{Mean} \pm \text{Standard Score (Standard Deviation}/\sqrt{\text{Sample Size})}$$

For the present example, the actual earning potential for this expert has a 95% probability of being between ±$12.40 the mean of $50, and thus a range of $37.60 to $62.40 (i.e. $50±1.96061215 ($20/√10)).

In order to be conservative with the experts presented to the user, the $37.6 estimate can be used to rank experts. To show how the preceding calculation can benefit experts with more views, by changing the number of expert profile views should from 10 to 100 in the previous example, the range of the potential earning opportunity value increases to $46.08-$53.92. Advantageously, the potential earning opportunity value is directly correlated to the number of expert profile views.

According to a third embodiment, the expert search server 104 can further sort the ordered listing of expert profiles by shuffling, such that at least one of the identified expert profiles is moved from a lower position within the ordered listing of expert profiles to a higher position. As described above, the position of an expert profile within a list of search results can bias the number of times the expert profile is selected by a user per view. By randomly shuffling an expert profile to the top, the shuffled expert profile can be compensated for position bias, and is given a better chance of being selected for hire by an end user.

In a particular implementation, the expert search server 104 can select one slot on each channel's display of experts, and shuffle in an expert randomly from lower in the stack. For example, page one of a category view on the website may display the experts as shown below:

List Position 1—Expert Ranked #1
List Position 2—Expert Ranked #2
List Position 3—Expert Ranked #3
List Position 4—Expert Ranked #4
List Position 5—Expert Ranked #5
List Position 6—Expert Ranked #132
List Position 7—Expert Ranked #6
List Position 8—Expert Ranked #7
List Position 9—Expert Ranked #8
List Position 10—Expert Ranked #9

Advantageously, the expert Ranked #132 is shuffled into the list position 6, which gives the expert a better revenue opportunity. In cases with fewer slots, for example, such as an implementation with only two expert slots, a lower ranked expert can be rotated into one of the two slots a certain percentage of page queries. For example, a lower ranked expert can be rotated into one of the two slots on 20% of page views. In some implementations, the lower ranked (or shuffled) expert is not inserted into the first few positions (e.g., not into the first or second position) to keep the top-most experts within the first few positions since they have a strong revenue history. In some implementations, a random spot from the lower positions (e.g., positions three through ten) is selected, and the lower ranked expert is inserted into the selected position. Advantageously, such random noise can be purposefully included in the sorting algorithm to give more revenue opportunities to less-frequently displayed experts.

With further respect to step 308, the data associated with the selected expert profiles and transmitted to the remote search engine server 110 can include data, such as executable instructions, that facilitate the real-time and non-real-time communication sessions over the network with the expert corresponding to the profile. The expert search server 104 can transmit executable instructions to the remote search engine server 110, where the executable instructions define a manner of displaying the identified expert profiles.

The following discussion relates to FIGS. 7-10B which illustrate various screenshot provided by one or more embodiments of the systems, methods and computer apparatus as disclosed herein.

Figure 7:
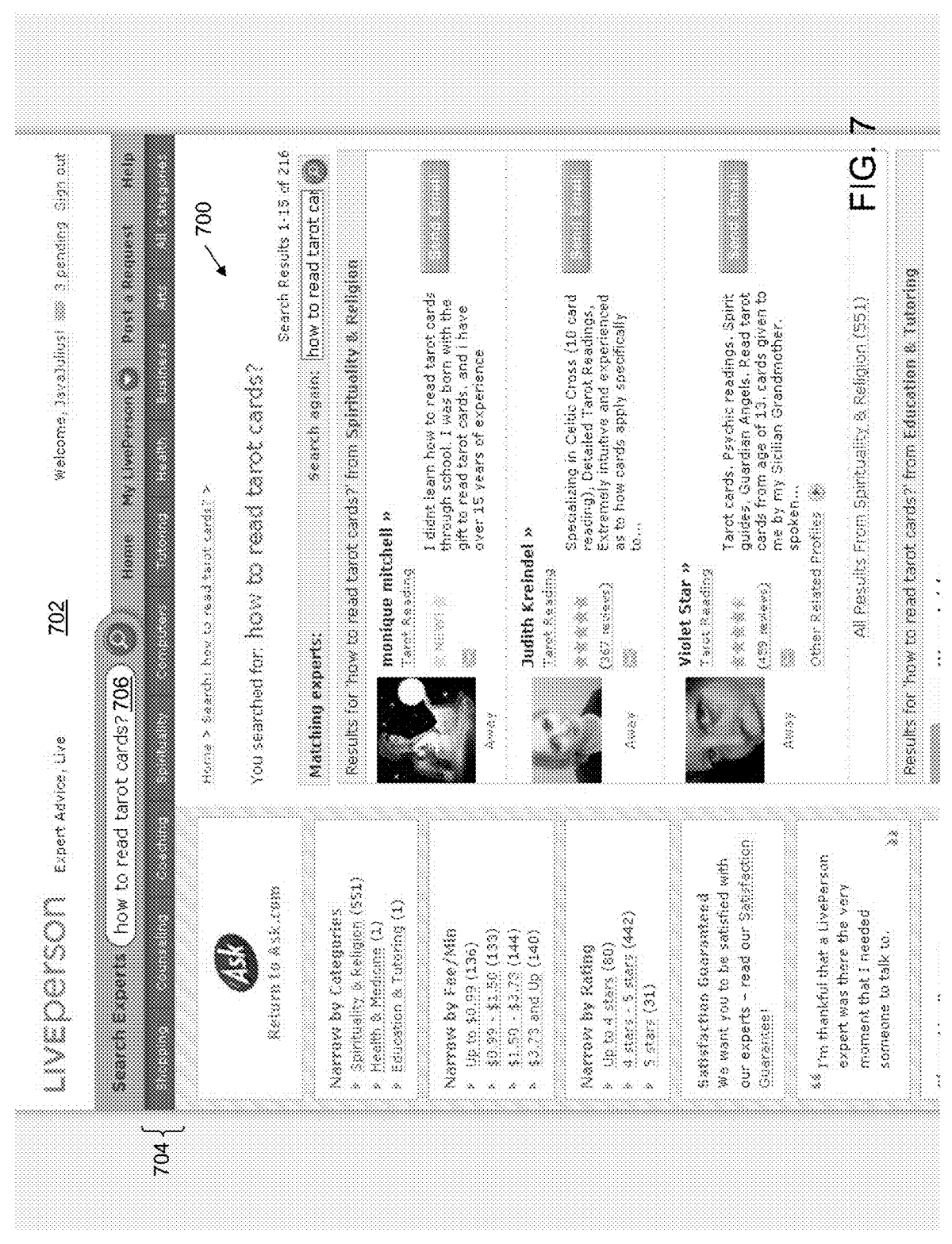

FIG. 7 is a screenshot showing an experts search results page 700 from an expert search engine (e.g., the expert search server 104, such as the LivePerson website) through a browser. In this embodiment, the user navigates from a generic search engine (e.g., Ask™) to the "search experts" page 702 retrieved from the expert search engine. From the search experts page 702 a user has several ways to search for experts. The user can select a particular category (sometimes referred to as a channel) from the list of categories 704 (see FIG. 8). Or the user can issue a keyword search to identify experts. As shown in FIG. 7, the user entered the keyword search "how to read tarot cards?" 706. The experts search results page 700 is generated by the expert search engine based on the keyword search 706. A user can search using any keywords, and the results displayed in the experts search results page 700 match the user's keywords search 706. As another example, a user can search for experts on "sports"

and a listing of experts which are related to the keyword "sports" can be displayed on the experts search results page 700.

Figure 8:
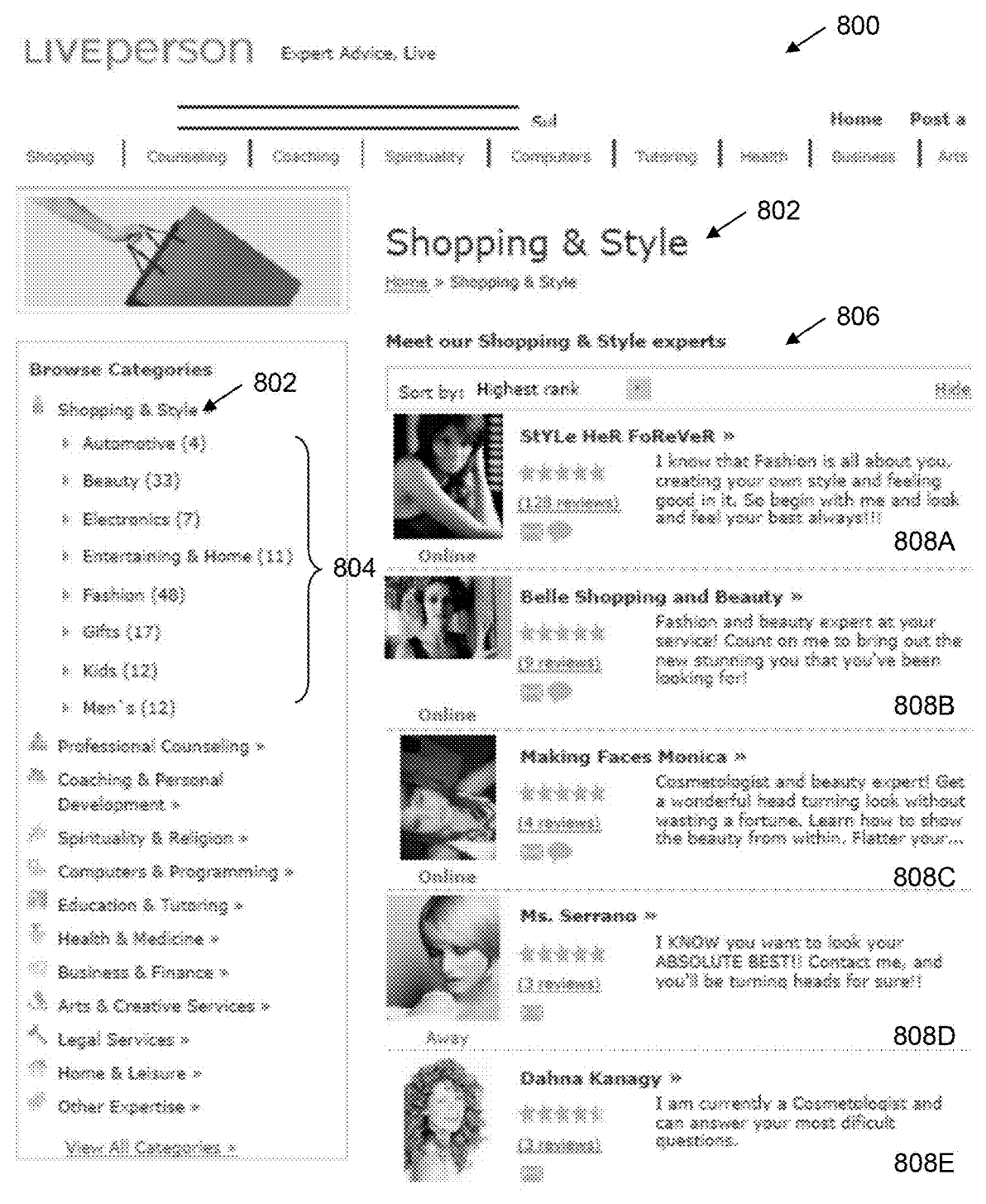

FIG. 8 is an exemplary screenshot showing a LivePerson expert search server webpage 800 for searching for experts by category. The category the user selected is "Shopping & Style" 802. In addition to searching categories, the user can also browse topics 804 within a particular category. The results for the category 802 selected by the user are displayed within the list 806, and include "mini" expert profiles 808A through 808E (which are described with reference to FIG. 6).

Figure 9:
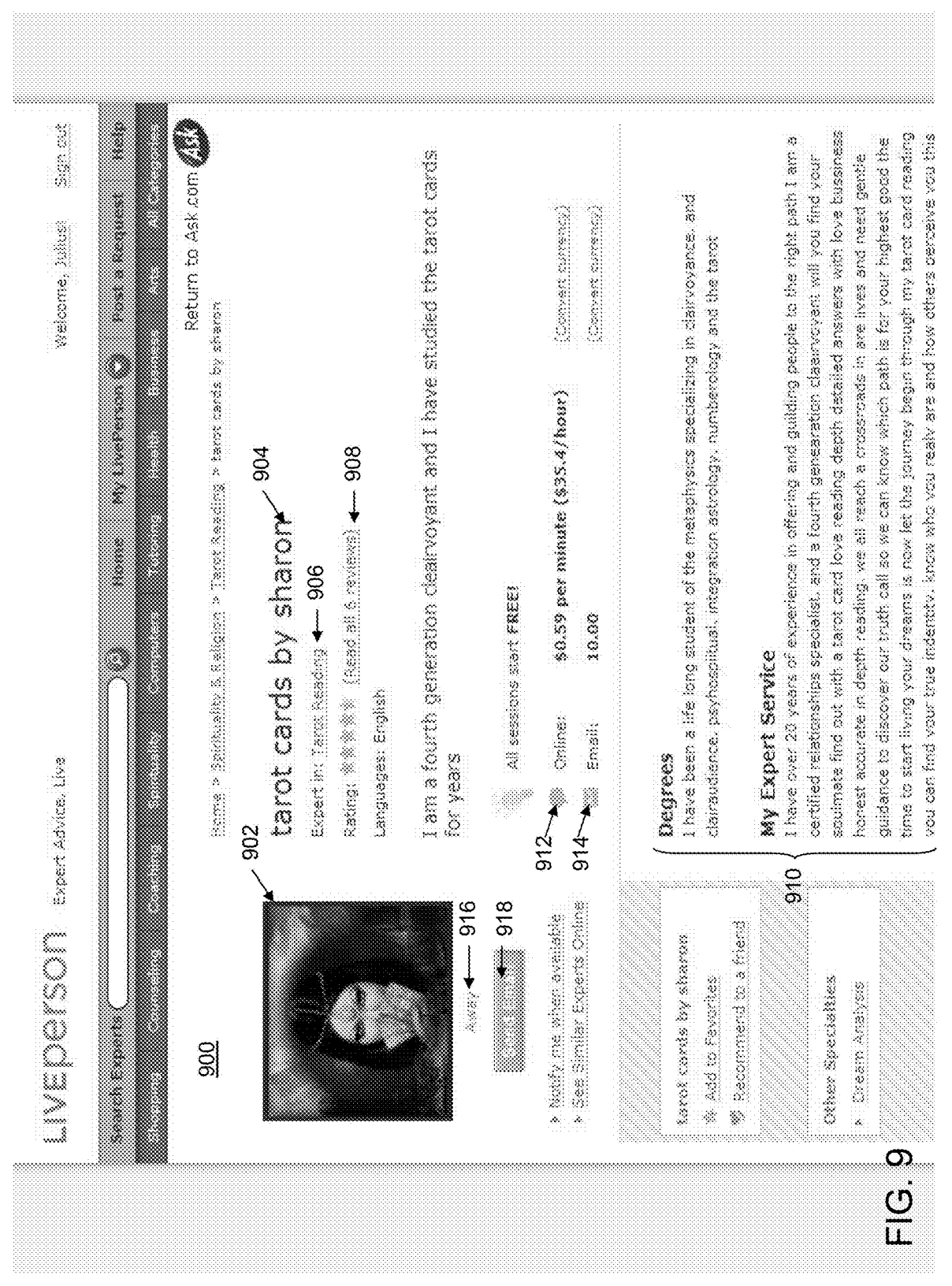

FIG. 9 is an exemplary screenshot showing an expert profile page 900 on the expert search server website (e.g., the LivePerson website) according to one embodiment. The expert profile page 900 includes a picture 902, a name 904, an expert category or topic 906, an expert rating 908, profile information 910, and contact pricing information for online chat prices 912 and offline communication prices 914. The status of the expert is indicated as away 916. A user viewing the expert profile page 900 can click the send email button 918 to send an email to the expert. If, for example, the user status was online instead of away, the user would also be presented with a contact live now button to facilitate an online chat session with the expert.

Figure 10B:
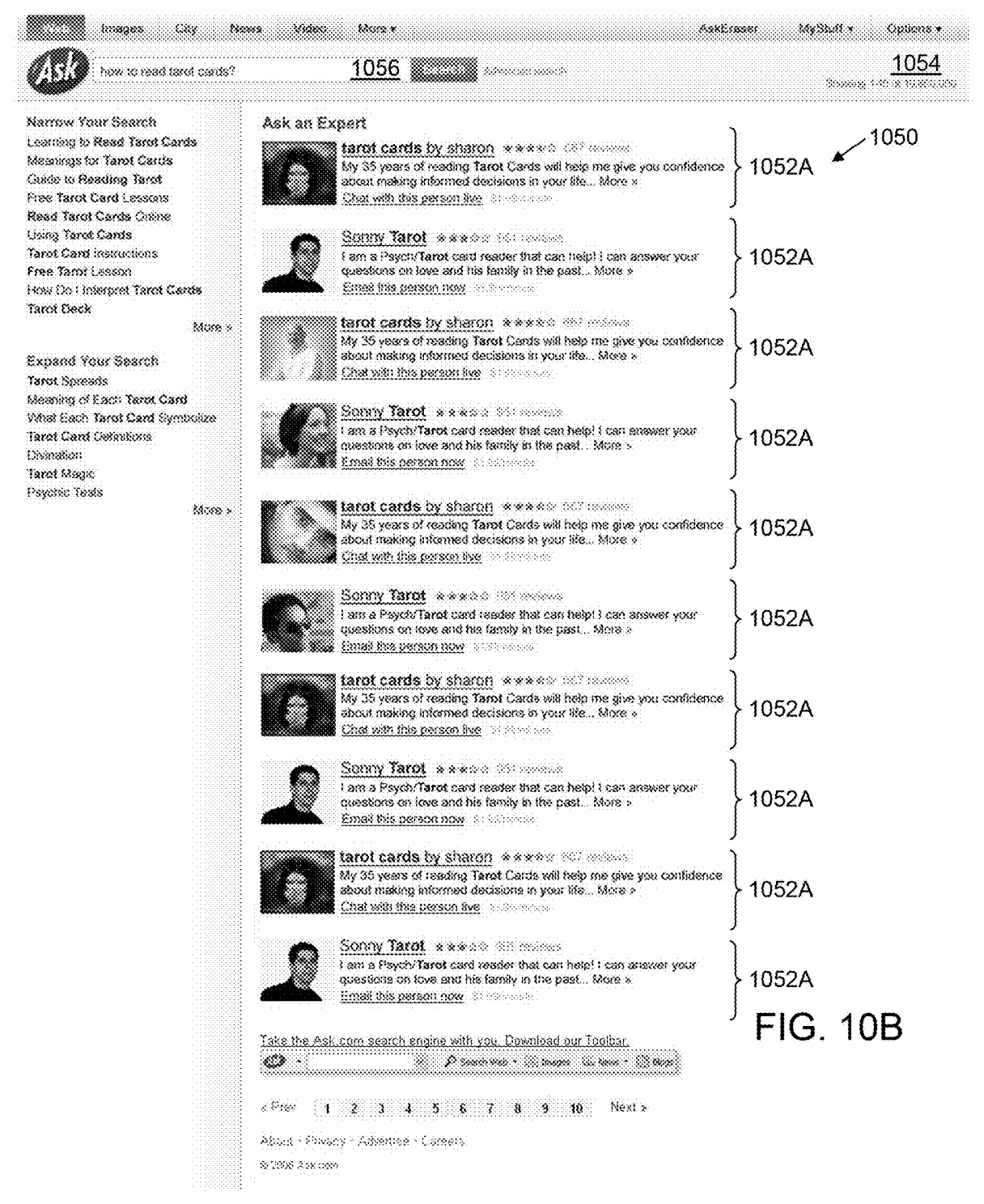

FIGS. 10A and 10B are exemplary screenshots showing expert profile pages presented by a generic search engine (e.g., search engine server 110) communicating using API calls with an expert search engine (e.g., expert search server 104) according to one embodiment. FIG. 10A shows a full expert profile 1000 on the Ask™ search engine website 1002. The full expert profile 1000 includes the same information as described with the expert profile page 900 of FIG. 9. FIG. 10B shows a list 1050 of mini expert profiles 1052A through 1052F on the Ask™ search engine website 1054. The list 1050 was generated by the expert search engine in response to the search query "how to read tarot cards?" 1056 executed by the user on the Ask™ search engine website 1052.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method, comprising:
   storing topic data and agent data in a database;
   associating topic data with one or more agents, wherein agents are active or inactive, wherein agents are relevant or irrelevant to the topic data, and wherein agents are relevant when a topic included in one or more profiles of one or more relevant agents matches the topic data;
   associating one or more interaction options with active relevant agents;
   determining status data, wherein the status data is stored in the database, and wherein the status data corresponds to active relevant agents associated with one or more interaction options and the topic data;
   receiving an agent search request, wherein the agent search request is automatically generated using published information, wherein the published information does not include a request for an agent, and wherein the agent search request includes the topic data and is used to determine active agents relevant to the topic data;
   using the status data to determine whether any agents relevant to the topic data are active;
   transmitting data associated with an interactive element, wherein the interactive element is associated with an active agent relevant to the topic data, wherein the interactive element is associated with the published information, wherein the interactive element is separate from the published information, and wherein the interactive element is displayed with the published information; and
   receiving data corresponding to a selection of the interactive element associated with the published information, wherein the selected interactive element is associated with one or more agents based on the status data, wherein the selection of the interactive element facilitates an interaction option among two or more devices, and wherein at least one device is associated with the active agent relevant to the topic data.

2. The method of claim 1, wherein the published information is associated with an information feed of a social networking website.

3. The method of claim 1, wherein the published information is associated with a discussion thread of a website.

4. The method of claim 1, wherein the status data is dynamically modifiable.

5. The method of claim 1, wherein the status data is active or inactive, wherein the status data is active when a relevant agent associated with the topic is active, and wherein the status data is inactive when a relevant agent associated with the topic is inactive.

6. The method of claim 1, wherein the one or more interaction options include communication logic configured to facilitate a real-time communication session.

7. The method of claim 6, wherein real-time communication sessions include text messaging sessions, internet telephony sessions, or real-time chat sessions, and wherein real-time chat sessions include audio, video, or textual communication.

8. The method of claim 1, wherein an agent corresponds to an individual, and wherein when a relevant agent is active, the individual is available, and wherein when a relevant agent is inactive, the individual is unavailable.

9. The method of claim 8, wherein an available individual is an individual that is available for a real-time communication session including text messaging sessions, internet telephony sessions, or real-time chat sessions, and wherein real-time chat sessions include audio, video, or textual communication.

10. The method of claim 1, wherein when a relevant agent associated with the topic data is active, corresponding status data is generated.

11. A system including an agent server, comprising:
   a processor;
   a non-transitory computer-readable storage medium containing instructions which when executed on the processor, cause the processor to perform operations including:
      storing topic data and agent data in a database;
      associating topic data with one or more agents, wherein agents are active or inactive, wherein agents are relevant or irrelevant to the topic data, and wherein agents are relevant when a topic included in one or more profiles of one or more relevant agents matches the topic data;
      associating one or more interaction options with active relevant agents;
      determining status data, wherein the status data is stored in the database, and wherein the status data corresponds to active relevant agents associated with one or more interaction options and the topic data;

receiving an agent search request, wherein the agent search request is automatically generated using published information, wherein the published information does not include a request for an agent, and wherein the agent search request includes the topic data and is used to determine active agents relevant to the topic data;

using the status data to determine whether any agents relative to the topic data are active;

transmitting data associated with an interactive element, wherein the interactive element is associated with an active agent relevant to the topic data, wherein the interactive element is associated with the published information, wherein the interactive element is separate from the published information, and wherein the interactive element is displayed with the published information; and receiving data corresponding to a selection of the interactive element associated with the published information, wherein the selected interactive element is associated with one or more agents based on the status data, wherein the selection of the interactive element facilitates an interaction option among two or more devices, and wherein at least one device is associated with the active agent relevant to the topic data.

12. The system of claim 11, wherein the published information is associated with a social networking website.

13. The system of claim 11, wherein the published information is associated with a discussion thread of a website.

14. The system of claim 11, wherein the status data is active or inactive, wherein the status data is active when a relevant agent associated with the topic is active, and wherein the status data is inactive when a relevant agent associated with the topic is inactive.

15. The system of claim 11, wherein the one or more interaction options include communication logic configured to facilitate a real-time communication session.

16. The system of claim 15, wherein real-time communication sessions include text messaging sessions, internet telephony sessions, or real-time chat sessions, and wherein real-time chat sessions include audio, video, or textual communication.

17. The system of claim 11, wherein when a relevant agent associated with the topic data is active, corresponding status data is generated.

18. A computer-program product tangibly embodied in a non-transitory machine-readable storage medium of an agent server, including instructions configured to cause a data processing apparatus to:

store topic data and agent data in a database;

associate topic data with one or more agents, wherein agents are active or inactive, wherein agents are relevant or irrelevant to the topic data, and wherein agents are relevant when a topic included in one or more profiles of one or more relevant agents matches the topic data;

associate one or more interaction options with active relevant agents;

determine status data, wherein the status data is stored in the database, and wherein the status data corresponds to active relevant agents associated with one or more interaction options and the topic data;

receive an agent search request, wherein the agent search request is automatically generated using published information, wherein the published information does not include a request for an agent, and wherein the agent search request includes the topic data and is used to determine active agents relevant to the topic data;

using the status data to determine whether any agents relevant to the topic data are active;

transmit data associated with an interactive element, wherein the interactive element is associated with an active agent relevant to the topic data, wherein the interactive element is associated with the published information, wherein the interactive element is separate from the published information, and wherein the interactive element is displayed with the published information; and receive data corresponding to a selection of the interactive element associated with the published information, wherein the selected interactive element is associated with one or more agents based on the status data, wherein the selection of the interactive element facilitates an interaction option among two or more devices, and wherein at least one device is associated with the active agent relevant to the topic data.

19. The computer-program product of claim 18, wherein the published information is associated with a social networking site.

20. The computer-program product of claim 18, wherein the published information is associated with a discussion thread of a website.

* * * * *